US012734824B2

(12) United States Patent
Doi

(10) Patent No.: US 12,734,824 B2
(45) Date of Patent: Sep. 15, 2026

(54) PRINTING APPARATUS AND ADJUSTMENT METHOD

(71) Applicant: SEIKO EPSON CORPORATION, Tokyo (JP)

(72) Inventor: Takashi Doi, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 131 days.

(21) Appl. No.: 18/926,482

(22) Filed: Oct. 25, 2024

(65) Prior Publication Data

US 2025/0135788 A1 May 1, 2025

(30) Foreign Application Priority Data

Oct. 27, 2023 (JP) ................................ 2023-184582

(51) Int. Cl.
*B41J 2/21* (2006.01)
*B41J 2/045* (2006.01)

(52) U.S. Cl.
CPC ......... *B41J 2/2132* (2013.01); *B41J 2/04508* (2013.01); *B41J 2/04581* (2013.01)

(58) Field of Classification Search
CPC .................. B41J 2/2132; B41J 2/04508; B41J 2/04581
See application file for complete search history.

(56) References Cited

U.S. PATENT DOCUMENTS

2003/0048326 A1* 3/2003 Yamasaki .......... H04N 1/00002 347/41

FOREIGN PATENT DOCUMENTS

JP 2018-144362 A 9/2018

* cited by examiner

*Primary Examiner* — Lisa Solomon
(74) *Attorney, Agent, or Firm* — Spencer Fane LLP

(57) ABSTRACT

A printing apparatus according to an aspect of the present disclosure includes a printing head including a plurality of printing chips including a plurality of nozzles, a main scanning unit, a sub-scanning unit, and a control unit, and is capable of printing a test pattern for acquiring a correction value for adjusting an ejection characteristic for each of the printing chips. The test pattern includes a reference pattern and an adjustment pattern. The control unit performs print control such that the reference pattern and the adjustment pattern are formed at positions adjacent to each other, and liquid is ejected onto an identical target region of a medium using at least two printing chips among the printing chips included in the printing head for the reference pattern to be formed in the identical target region.

11 Claims, 12 Drawing Sheets

PRINTING APPARATUS AND ADJUSTMENT METHOD

The present application is based on, and claims priority from JP Application Serial Number 2023-184582, filed Oct. 27, 2023, the disclosure of which is hereby incorporated by reference herein in its entirety.

BACKGROUND

1. Technical Field

The present disclosure relates to a printing apparatus and an adjustment method.

2. Related Art

JP 2018-144362 A discloses a technique, in a printing apparatus, for calibrating input voltages among printing chips using an image captured by an imaging unit.

In the technique described in JP 2018-144362 A, by calibrating the input voltages among the printing chips, it is possible to reduce differences in output density at the time of printing due to individual differences among the printing chips, however, since the imaging unit is required, there is concern about an increase in manufacturing cost and in a size of the printing apparatus. In addition, the present discloser has considered a method of evaluating the differences in output density at the time of printing among the printing chips by visual observation and correcting the input voltages based on the evaluation instead of using the imaging unit, however, since the evaluation depends on an evaluator, it is difficult to perform adjustment to reduce the differences with satisfactory quality.

Therefore, it is desired to develop a technique, in a printing apparatus, capable of accurately adjusting differences in output density at the time of printing caused by individual differences among printing chips while suppressing an increase in manufacturing cost and an increase in size.

SUMMARY

A printing apparatus according to an aspect of the present disclosure is a printing apparatus including a printing head including a plurality of printing chips including a plurality of nozzles configured to eject liquid onto a medium, a main scanning unit configured to relatively move the printing head and the medium in a main scanning direction, a sub-scanning unit configured to relatively move the printing head and the medium in a sub-scanning direction intersecting the main scanning direction, and a control unit configured to perform print control including control of the relative movement by the main scanning unit and the sub-scanning unit and control of the ejection of the liquid from the printing head to perform printing on the medium, and configured to print a test pattern for acquiring a correction value for adjusting an ejection characteristic for each of the printing chips included in the printing head, wherein the test pattern includes a reference pattern being a single density gradation, and an adjustment pattern including a patch group in which a single density gradation patch is formed for each of a plurality of different gradations, and the control unit performs the print control such that when printing of the test pattern is performed, the reference pattern and the adjustment pattern are formed at positions adjacent to each other, and such that the liquid is ejected onto an identical target region of the medium using at least two of the printing chips among the printing chips included in the printing head for the reference pattern to be formed in the identical target region.

An adjustment method according to an aspect of the present disclosure is an adjustment method in a printing apparatus that includes a printing head including a plurality of printing chips including a plurality of nozzles configured to eject liquid onto a medium, a main scanning unit for relatively moving the printing head and the medium in a main scanning direction, and a sub-scanning unit for relatively moving the printing head and the medium in a sub-scanning direction intersecting the main scanning direction, and performs print control including control of the relative movement by the main scanning unit and the sub-scanning unit and control of the ejection of the liquid from the printing head to perform printing on the medium, wherein the printing apparatus performs test pattern printing of printing a test pattern for acquiring a correction value for adjusting an ejection characteristic for each of the printing chips included in the printing head, the test pattern includes a reference pattern being a single density gradation, and an adjustment pattern including a patch group in which a single density gradation patch is formed for each of a plurality of different gradations, and the test pattern printing is performed by performing the print control such that the reference pattern and the adjustment pattern are formed at positions adjacent to each other, and such that the liquid is ejected onto an identical target region of the medium using at least two of the printing chips among the printing chips included in the printing head for the reference pattern to be formed in the identical target region.

A printing apparatus according to another aspect of the present disclosure is a printing apparatus including a printing head including a plurality of printing chips including a plurality of nozzles configured to eject liquid onto a medium, a main scanning unit for relatively moving the printing head and the medium in a main scanning direction, a sub-scanning unit for relatively moving the printing head and the medium in a sub-scanning direction intersecting the main scanning direction, and a control unit for performing print control including control of the relative movement by the main scanning unit and the sub-scanning unit and control of the ejection of the liquid from the printing head to perform printing on the medium, and configured to print a test pattern for acquiring a correction value for adjusting an ejection characteristic for each of the printing chips included in the printing head, the printing apparatus further including a reception unit configured to receive information indicating a priority when the ejection characteristic is adjusted, wherein the test pattern includes a reference pattern being a single density gradation, and an adjustment pattern including a patch group in which a single density gradation patch is formed for each of a plurality of different gradations, and the control unit, when performing printing of the test pattern, performs the print control such that the reference pattern and the adjustment pattern are formed at positions adjacent to each other, and determines the printing chip used when forming the reference pattern, according to the information received by the reception unit.

DESCRIPTION OF EMBODIMENTS

Below, embodiments according to the present disclosure will be described with reference to the drawings. Note that each drawing is merely illustrative for describing the present embodiment. For example, in drawings of printing results and the like, proportions, shapes, and shading are not precise, consistent, or are partially omitted in some cases.

Embodiment 1

Figure 1:
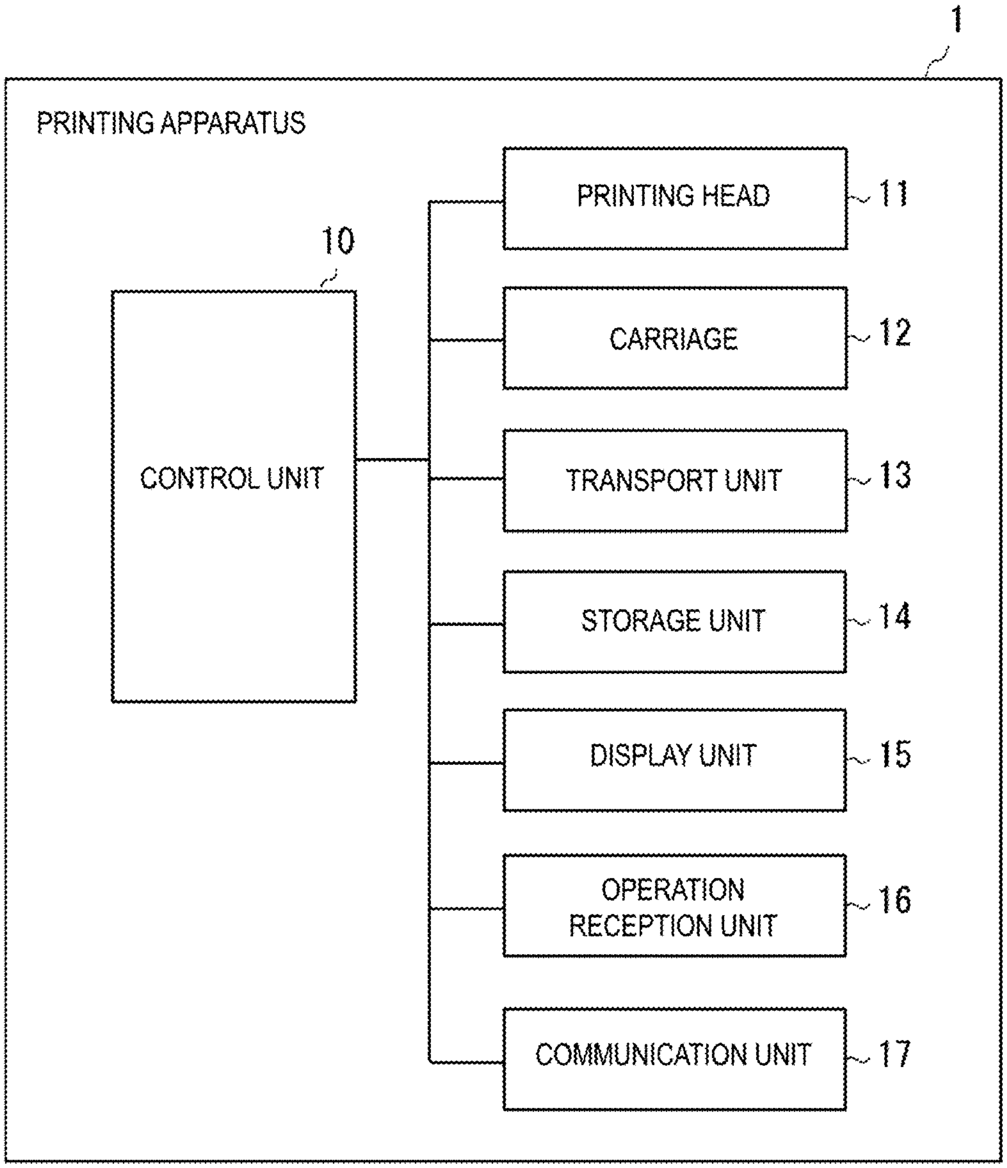
FIG. 1 is a block diagram illustrating one example of a printing apparatus according to Embodiment 1.
Figure 2:
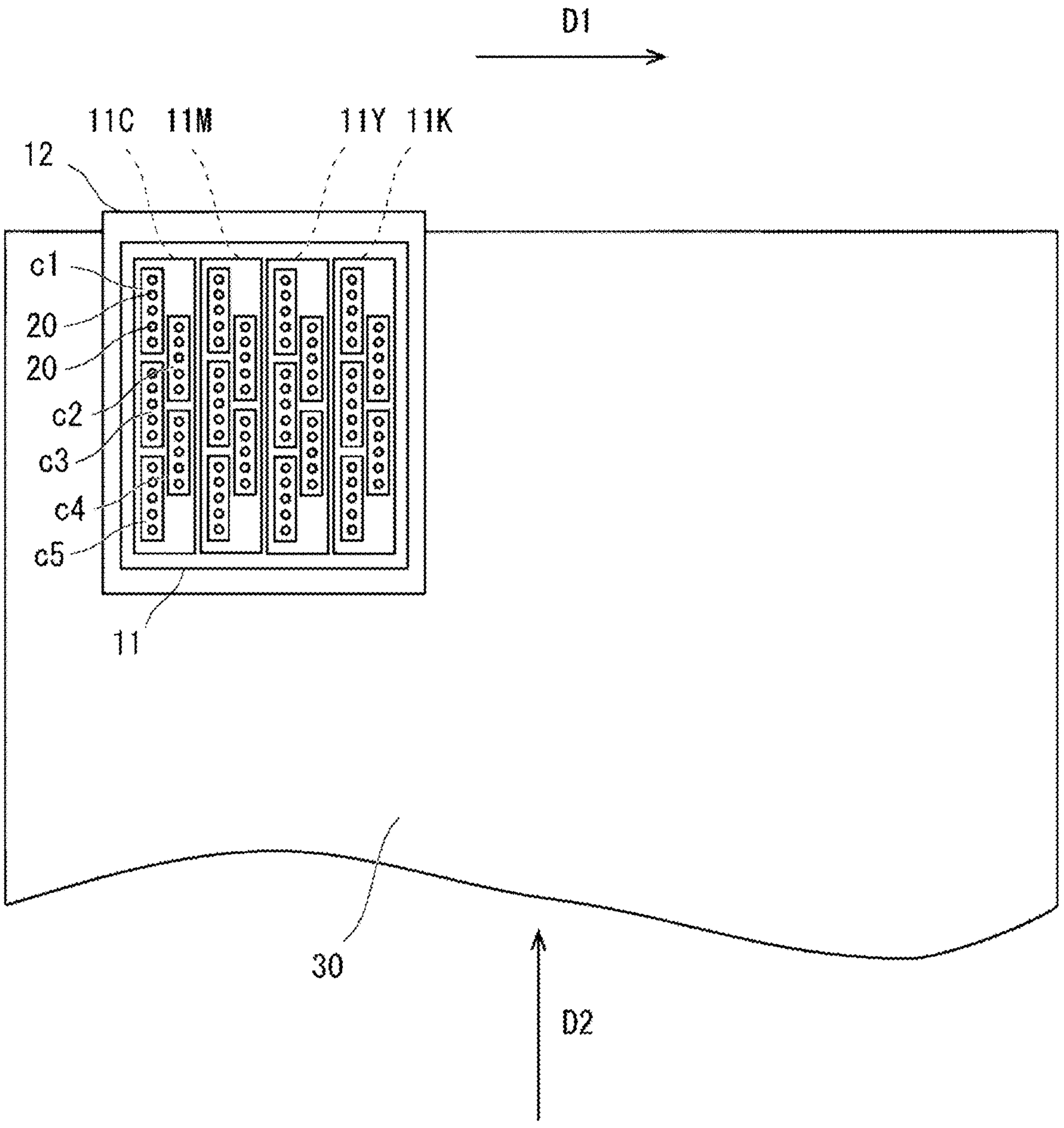
FIG. 2 is a diagram schematically illustrating one example of a carriage on which a printing head in the printing apparatus in FIG. 1 is mounted, together with a medium.

A printing apparatus according to Embodiment 1 and an adjustment method in the printing apparatus will be described using FIGS. 1 to 5. FIG. 1 is a block diagram illustrating one example of the printing apparatus according to Embodiment 1. FIG. 2 is a diagram schematically illustrating one example of a carriage on which a printing head in the printing apparatus in FIG. 1 is mounted, together with a medium.

The printing apparatus 1 illustrated in FIG. 1 includes a control unit 10 and a printing head 11. In addition, the printing apparatus 1 can include a carriage 12, a transport unit 13, a storage unit 14, a display unit 15, an operation reception unit 16, and a communication unit 17. Note that although not illustrated, the printing apparatus 1 may include a detector group that monitors a state of operation inside the printing apparatus 1, and in this case, the control unit 10 can control each unit based on a detection result by the detector group. Hereinafter, each component will be described on the assumption that the printing apparatus 1 is an inkjet printer that performs printing by an inkjet method.

The control unit 10 can also be referred to as a controller, and performs overall control of the printing apparatus 1. This control includes print control including control of relative movement between a medium 30 and the printing head 11 by the carriage 12 and the transport unit 13 and control of ejection of liquid from the printing head 11. The control unit 10 is to cause the liquid to be ejected onto the medium 30 to perform printing by the print control. The control unit 10 is configured to be able to perform, as the print control, print control for printing a test pattern. The print control in the printing of the test pattern is one of features of the present embodiment, and a specific example thereof will be described later.

It may be possible to configure the control unit 10 so as to include, for example, an arithmetic processing device such as a central processing unit (CPU) or a graphics processing unit (GPU), a memory for works, a storage device configured to store programs and parameters for control, and the like. It may be possible to configure the control unit 10 as a system on a chip (SoC). As can be understood from these examples, it may be possible that the control unit 10 is configured to store a control program, so as to be able to execute them. However, it may also be possible to configure the control unit 10 so as to store the control programs as a circuit configuration such as a field-programmable gate array (FPGA), or configure the control unit 10 as a dedicated circuit. It may be possible that the programs described above include a program for performing print control described below.

The printing head 11 performs printing by ejecting liquid onto the medium 30 by an inkjet method under the control of the control unit 10. Droplets ejected by the printing head 11 are referred to as dots. The liquid is mainly ink, and the following description will be given assuming that the liquid is the ink, but it may also be possible to eject liquid other than ink. Further, the printing head 11 can be referred to as an ink ejecting head. Further, the printing head 11 is to perform recording on the medium 30, and can be referred to as a recording head. For a similar reason, the printing apparatus 1 can also be referred to as a recording device. Further, the medium 30 is, for example, a sheet, but may be any medium that can be printed on by ink, and may be a material other than paper, such as film or cloth.

A plurality of nozzle rows are formed at a lower surface of the printing head 11. In each nozzle row, one or more rows of nozzles 20 that are capable of ejecting ink onto the medium 30 are arranged. Each nozzle 20 ejects ink of a predetermined color. The printing head 11 has a configuration in which ink of a plurality of predetermined colors can be ejected from the nozzle rows formed thereat, but may have a configuration in which ink of only one predetermined color can be ejected. The nozzle 20 for each of the colors communicates with an ink chamber filled with ink of a corresponding color, and is supplied with the ink of the corresponding color from the corresponding ink chamber. As for the method of ejecting ink from the nozzles 20, it may be possible to employ a piezo method in which a voltage is applied to a piezoelectric element as a drive element to expand and contract the ink chamber to eject the ink from the nozzles 20. However, the ink ejection method from the nozzle 20 may be another method, such as a thermal method in which a voltage is applied to a heating element to generate air bubbles in the nozzle 20, and the air bubbles are used to eject ink from the nozzle 20.

In the present embodiment, the printing head 11 includes a plurality of printing chips including a plurality of the nozzles 20, and thus the plurality of nozzle rows described above are formed. Hereinafter, as illustrated in FIG. 2, a description will be given by using an example in which the printing head 11 includes printing heads 11C, 11M, 11Y, and 11K that eject cyan (C), magenta (M), yellow (Y), and black (K) inks, respectively, onto the medium 30.

In the example in FIG. 2, each of the printing heads 11C, 11M, 11Y, and 11K includes printing chips c1 to c5 each including the five nozzles 20. The printing head 11C is a printing head for cyan, and includes the five printing chips c1 to c5 each including a nozzle group in which a plurality of the nozzles 20 for ejecting the cyan ink are arranged. Similarly, the printing head 11M is a printing head for magenta, and includes the five printing chips c1 to c5 each including a nozzle group in which a plurality of the nozzles 20 for ejecting the magenta ink are arranged. The printing head 11Y is a printing head for yellow, and includes the five printing chips c1 to c5 each including a nozzle group in which a plurality of the nozzles 20 for ejecting the yellow ink are arranged. The printing head 11K is a printing head for black, and includes the five printing chips c1 to c5 each including a nozzle group in which a plurality of the nozzles 20 for ejecting the black ink are arranged.

The five printing chips c1 to c5 included in each of the printing heads 11C, 11M, 11Y, and 11K are similarly arranged at similar positions at each of the printing heads 11C, 11M, 11Y, and 11K. To be specific, the printing chips c1 to c3 are arranged in a row in a sub-scanning direction D2, and the printing chips c4 and c5 are also arranged in a row in the sub-scanning direction D2. Then, the printing chips c1 to c3 and the printing chips c4 and c5 are arranged side by side in a main scanning direction D1 so as to provide a partially overlapping region in the sub-scanning direction D2.

The printing heads 11C, 11M, 11Y, and 11K are arranged along the main scanning direction D1, and the nozzles 20 are located at the same position in the sub-scanning direction D2. Each of the printing chips c1 to c5 includes a nozzle row in which the five nozzles 20 are arranged at predetermined intervals in the sub-scanning direction D2. Note that this predetermined interval is referred to as a nozzle pitch. Note that in FIG. 2, a nozzle arrangement direction in which the plurality of nozzles 20 constituting the same nozzle row are arranged is parallel to the sub-scanning direction D2, but the nozzle arrangement direction may obliquely intersect the sub-scanning direction D2. Each of the printing chips c1 to c5 is, for example, a printing chip obtained by chipping an ink ejection mechanism including a piezoelectric element, an ink chamber, a nozzle, and the like through application of a semiconductor processing technique.

An input signal is supplied from the control unit 10 to each of the printing chips c1 to c5 in the printing head 11C, and ink is ejected from a nozzle group in response to an input voltage applied by the input signal. Here, mutually different input signals, as input signals for forming dots of the same size, that is, mutually different input voltages may be supplied to nozzle groups respectively arranged at different printing chips. For example, an input voltage supplied to a nozzle group arranged at the printing chip c1 to form dots of a certain size and an input voltage supplied to a nozzle group arranged at the printing chip c2 to form dots of the same size may be different from each other. Ejection of ink in each of the printing heads 11M, 11Y, and 11K is similar to that in the printing head 11C.

As described above, an initial value of an input signal used for each printing chip, in other words, an initial value of an input voltage is stored in advance in the memory in the control unit 10. Then, the initial value is set at least before shipment of the printing apparatus 1 as a voltage value common to printing apparatuses of the same model as the printing apparatus 1. However, due to individual differences among the printing chips c1 to c5, that is, due to differences in ejection characteristic among the printing chips, even when an input voltage of the initial value is supplied, an amount of ink to be ejected varies, and there is a risk that dots of a desired size cannot be obtained.

Therefore, in the printing apparatus 1, by performing input voltage correction processing for correcting an input voltage, that is, input voltage calibration processing, differences in amounts of ink to be ejected due to individual differences are reduced, and desired ink densities are obtained. That is, in the printing apparatus 1, even when a waveform having the same amplitude of a driving waveform which is a waveform of an input signal is applied to a plurality of printing chips, dots having different sizes are ejected, resulting in different ink densities in some cases, and in order to correct this, the input voltage is corrected. The input voltage correction processing adjusts output densities of the ink among the printing chips, thus is hereinafter referred to as inter-chip output density adjustment processing. The inter-chip output density adjustment processing is assumed to be performed by a user of the printing apparatus 1, but can be performed before shipment of the printing apparatus 1.

Here in order to perform the inter-chip output density adjustment processing, the printing apparatus 1 prints a test pattern, causes the user to evaluate differences in output density at the time of printing among the printing chips by visual observation, and to select a correction value for an input voltage. Such evaluation and selection techniques, as well as examples of a test pattern that facilitate such evaluation, will be described below. As described above, the printing apparatus 1 has a function of printing a test pattern for acquiring a correction value for adjusting an ejection characteristic of each of the printing chips included in the printing head 11. Note that the test pattern is used to adjust an output density by visual observation, and thus may be referred to as a visual observation adjustment chart.

Note that although the example in which the printing head 11 in FIG. 1 is the printing head 11 illustrated in FIG. 2 has been described, it is sufficient that the printing head 11 in FIG. 1 is a printing head that can print an image of desired image quality on a medium and has a plurality of printing chips mounted thereat. That is, in the printing head 11, the number of nozzles of each color, the nozzle pitch, the color of ink, the number of colors, and the like are not limited to those exemplified. For example, although the example in which the five nozzles 20 are formed at each of the color-dedicated printing chips c1 to c5 has been described, the number of nozzles 20 formed at each of the printing chips c1 to c5 is not limited. In addition, at the printing head 11, a large number of nozzles can be formed in advance per color for ink of black or the like which is frequently used. In addition, ink may be a photo-curable ink such as an ultraviolet (UV) curable ink which is cured when irradiated with ultraviolet light, and in this case, the printing apparatus 1 is to be provided with an irradiation unit for ultraviolet light irradiation.

The carriage 12 is one example of a main scanning unit that relatively moves the printing head 11 and the medium 30 in the main scanning direction D1. The carriage 12 causes the printing head 11 to reciprocate along the predetermined main scanning direction D1 under the control of the control unit 10. The printing head 11 is mounted at the carriage 12 for the reciprocation. Therefore, movement of the carriage 12 is synonymous with the movement of the printing head 11. In addition, for the reciprocation, the printing apparatus 1 can include a guide rail, a movement mechanism, and a carriage motor which are not illustrated. The guide rail is a rail that functions as a guide for moving the carriage 12 in the main scanning direction D1, and the movement mechanism is a mechanism that moves the carriage 12 in the main scanning direction D1 along the guide rail using the carriage motor as power.

The main scanning direction D1 can indicate a width direction of the medium 30, that is a direction in which the printing head 11 is moved at the carriage 12. Note that for the sake of simplicity, a path in the main scanning direction D1 illustrated in FIG. 2 is referred to as a forward path, and an opposite path is referred to as a backward path. The printing apparatus 1 can perform printing in both the forward path and the backward path, but can perform printing in only one path of the forward path and the backward path, and only move to return a position of the carriage 12 in another path.

Further, the transport unit 13 is one example of a sub-scanning unit that relatively moves the printing head 11 and the medium 30 in the sub-scanning direction D2. The transport unit 13 transports the medium 30 to a position where printing can be performed along a predetermined transport path under the control of the control unit 10, and transports the medium 30 by a predetermined transport amount in the sub-scanning direction D2 which is a transport direction during printing. For example, the transport unit 13 can include a roller that rotates to transport the medium 30, a motor as a driving source for rotation, and the like. Further, the transport unit 13 may be a mechanism that transports the medium 30 with the medium 30 mounted on a motor-driven drum, belt, or pallet.

A relationship between the printing head 11 and the medium 30 will be additionally described. FIG. 2 simply illustrates the relationship between the printing head 11 and the medium 30 from above. The main scanning direction D1 and the sub-scanning direction D2 intersect each other. The term “intersect” as used herein refers to orthogonal or substantially orthogonal.

As described above, the carriage 12 has the printing head 11 mounted thereat, and can reciprocate together with the printing head 11 in the main scanning direction D1. The transport unit 13 transports the medium 30 from upstream to downstream in the sub-scanning direction D2, as indicated by an arrow of the sub-scanning direction D2. Further, transport by a predetermined distance downstream in the sub-scanning direction D2 performed by the transport unit 13 between passes can be referred to as “paper feeding”. The control unit 10 alternately repeats a pass and paper feeding to print a two-dimensional image on the medium 30.

Note that the printing apparatus 1 may be configured in advance such that the carriage 12 having the printing head 11 mounted thereat is capable of reciprocating not only along the main scanning direction D1 but also along the sub-scanning direction D2. That is, the printing head 11 may print a two-dimensional image on the medium 30 by moving by a predetermined distance upstream in the transport direction D2 instead of paper feeding between passes.

As described with reference to FIG. 2, a printing method in which the printing head 11 performs passes while moving along the main scanning direction D1 and the medium 30 is fed in the sub-scanning direction D2 between passes is referred to as a serial method. On the other hand, a printing method in which the printing head 11 performs passes while moving along the main scanning direction D1 and moves along the sub-scanning direction D2 instead of paper feeding between passes is referred to as a lateral method. Hereinafter, the description will be continued on the assumption of the serial method, but the description may be naturally interpreted by replacing the serial method with the lateral method.

For example, the storage unit 14 is a storage device according to a hard disk drive, a solid state drive, or other memories. A portion of the memory included in the control unit 10 may be regarded as the storage unit 14. The storage unit 14 may be regarded as a portion of the control unit 10.

The display unit 15 is a portion for displaying information and is configured by, for example, a display device such as a liquid crystal display or an organic EL display. The display unit 15 may include a display and a drive circuit for driving the display.

The operation reception unit 16 is a portion that receives an operation or an input by a user. The operation reception unit 16 can be achieved by, for example, one or both of a physical button and a touch panel mounted at the display unit 15. In a configuration in which the operation reception unit 16 includes a touch panel, the display unit 15 and the touch panel may be collectively referred to as an operation panel of the printing apparatus 1.

The communication unit 17 may be one or a plurality of communication interfaces for the printing apparatus 1 to perform communication with one or a plurality of external devices in a wired or wireless manner, in accordance with a predetermined communication protocol including predetermined communication standards. The external device is a device provided with a communication function such as a personal computer (PC), a server, a smartphone, or a tablet terminal, for example. In addition, the external device can output print data for causing the printing apparatus 1 to print an image to the printing apparatus 1, and the printing apparatus 1 which receives the print data can perform printing on a medium. Further, the external device can also perform various settings in the printing apparatus 1. The various settings can include an instruction to print a test pattern and a setting of a correction value of an input voltage thereafter, which will be described later.

Figure 3:
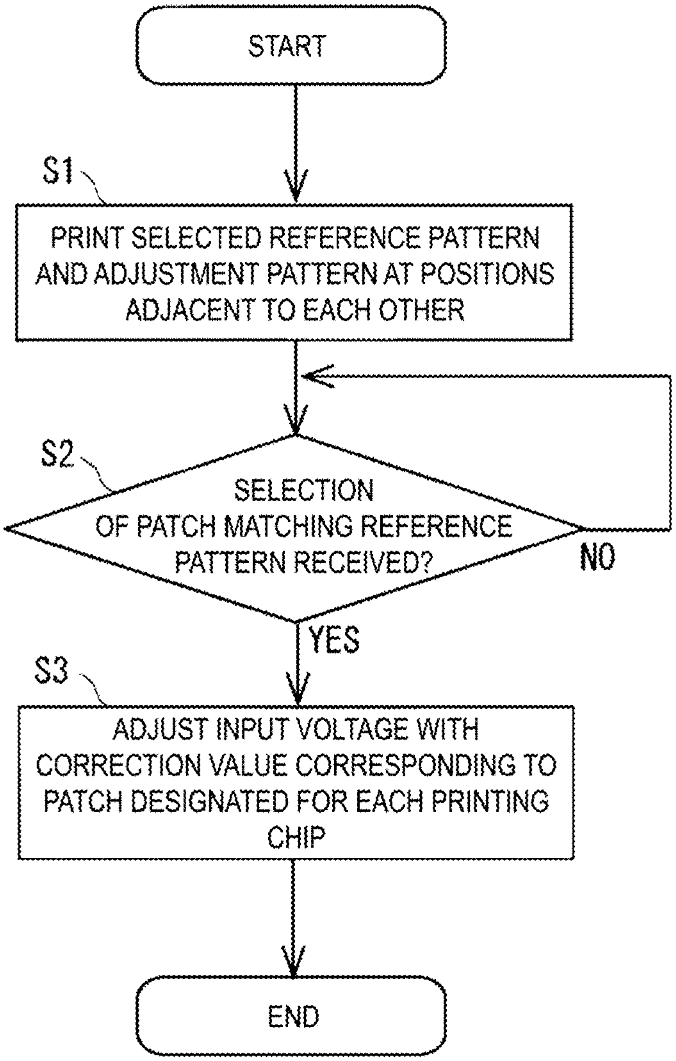
FIG. 3 is a flowchart illustrating one example of inter-chip output density adjustment processing in the printing apparatus in FIG. 1.
Figure 4:
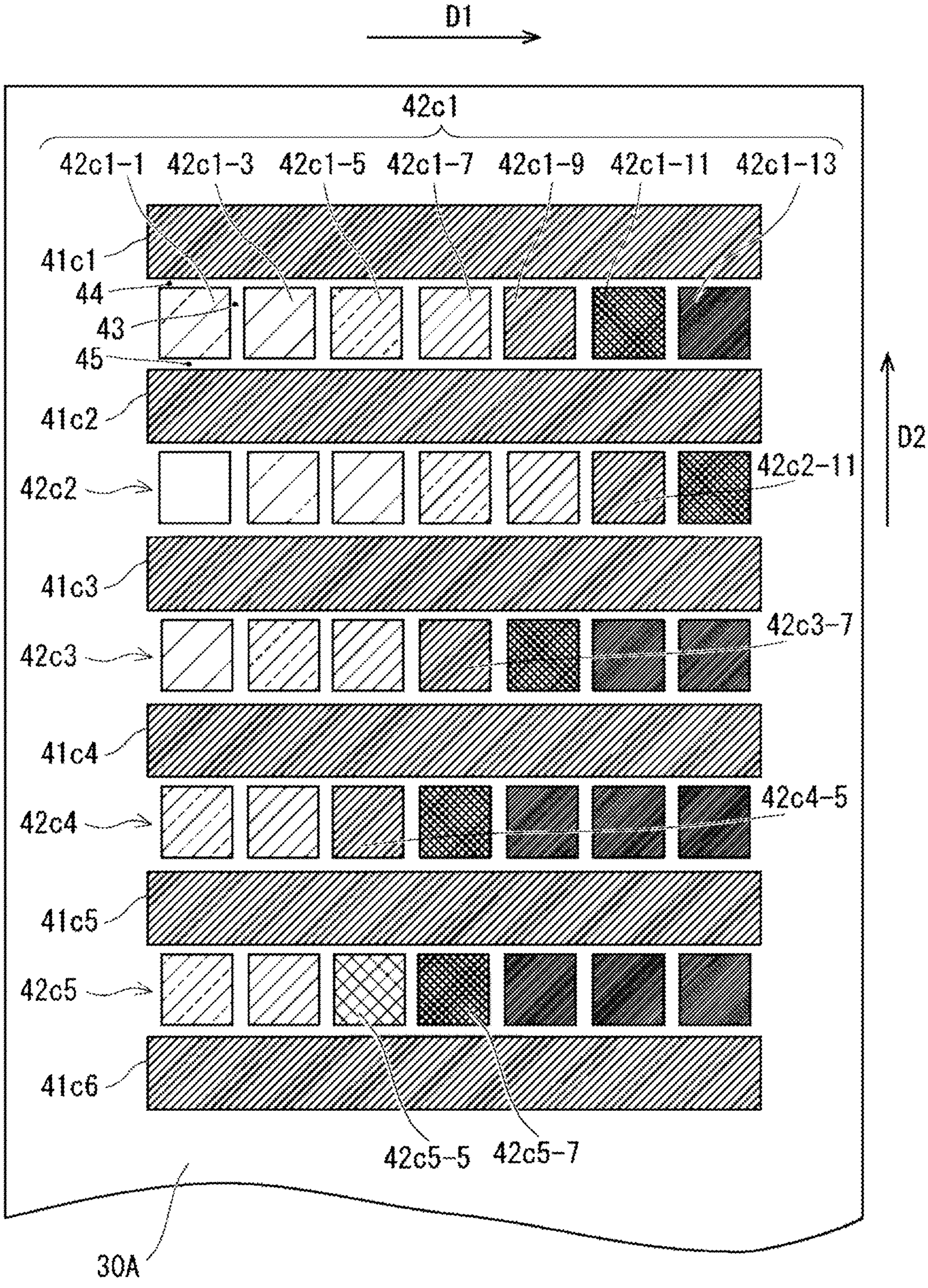
FIG. 4 is a schematic diagram illustrating one example of a test pattern printed on the medium in the printing apparatus in FIG. 1.
Figure 5:
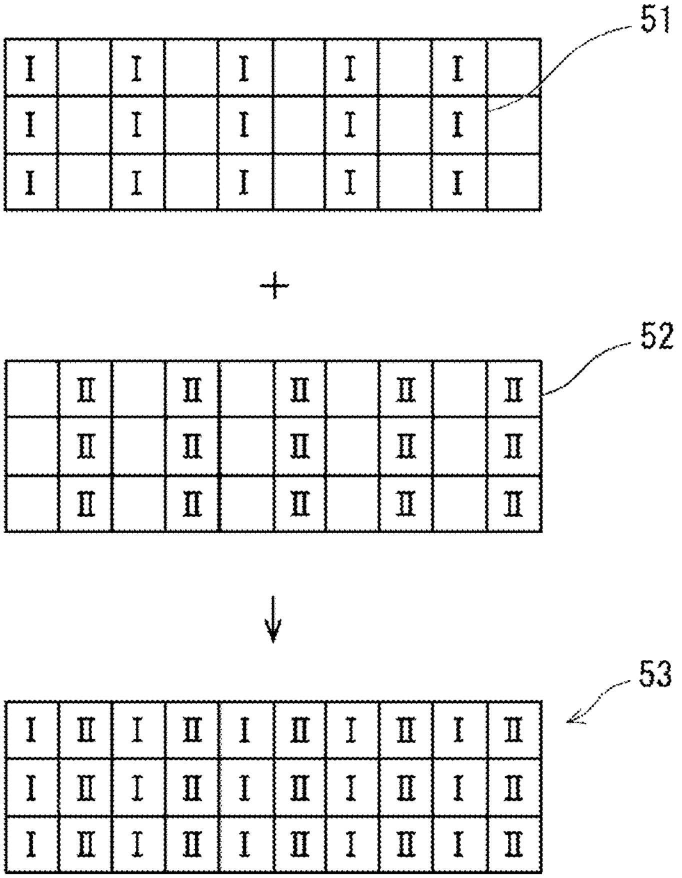
FIG. 5 is a schematic diagram illustrating a print control example of a reference pattern by a plurality of printing chips in the printing apparatus in FIG. 1.

Next, one example of the inter-chip output density adjustment processing including test pattern printing processing in the printing apparatus 1 will be described using FIGS. 3 and 4. FIG. 3 is a flowchart illustrating one example of the inter-chip output density adjustment processing in the printing apparatus 1 in FIG. 1. FIG. 4 is a schematic diagram illustrating one example of a test pattern printed on the medium 30 in the printing apparatus 1 in FIG. 1. FIG. 5 is a schematic diagram illustrating a print control example of a reference pattern by a plurality of printing chips in the printing apparatus 1 in FIG. 1.

The control unit 10 controls the printing head 11, the carriage 12, and the transport unit 13 so as to print a test pattern. The test pattern includes a reference pattern being a single density gradation, and an adjustment pattern including a patch group in which a single density gradation patch is formed for each of a plurality of different gradations. Note that the patch may be referred to as a pattern or a solid pattern. The reference pattern is a pattern serving as a reference for comparison in order to cause a user to check for which patch of the patch group included in the adjustment pattern correction is to be performed, that is, for which patch as a target correction is to be performed. The reference pattern may also be referred to as a pattern for standard, a pattern for reference, a target pattern, or the like. The adjustment pattern is a pattern for performing adjustment for a printing chip, and is formed for each printing chip to be adjusted, and thus can also be referred to as an adjustment pattern for printing chip or a pattern for adjustment.

The printing chips to be adjusted in the inter-chip output density adjustment processing can basically be all the printing chips included in the printing head 11. However, all of the printing chips included in the printing head 11 may be set as adjustment targets in a plurality of times, for example, for each color, and in this case, it is sufficient that designation of the adjustment targets in each time is based on user designation or presetting. In addition, the printing chips to be adjusted may be some printing chips determined in advance by user designation, presetting, or the like among the printing chips included in the printing head 11. In an extreme example, the printing chip to be adjusted may be one printing chip, such as the printing chip c1 of the printing head 11C. However, even in this case, when a reference pattern is formed as will be described later, a plurality of printing chips including other printing chips of the same color such as the printing chips c2 and c1 of the printing head 11C or the printing chips c2 and c3 of the printing head 11C are to be used.

In the following, for simplification of description, only test pattern printing and adjustment for the printing chips c1 to c5 mounted at the printing head 11C will be described. However, the same applies to the printing heads 11M, 11Y, and 11K dedicated to the other colors, and even when some of the printing chips c1 to c5 dedicated to a certain color are to be adjusted, it is sufficient that a test pattern including a similar reference pattern is printed. In addition, when adjustment is performed for printing heads dedicated for two or more colors at the same time, it is sufficient that test patterns for the printing heads dedicated for the respective colors are printed at a time, the user is cause to select correction values at a time, and adjustment of output densities among printing chips of target colors is performed.

In test pattern printing for the printing head 11C, a reference pattern formed by the printing head 11C and an adjustment pattern formed by each of the printing chips c1 to c5 mounted at the printing head 11C are to be included.

Then, the control unit 10 performs print control such that the reference pattern and the adjustment pattern are formed at positions adjacent to each other when printing of the test pattern is performed (step S1). An example of the pattern formation at the adjacent positions will be described using FIG. 4.

FIG. 4 illustrates a medium 30A obtained by printing a test pattern on the medium 30. The test pattern includes an adjustment pattern 42*c*1 formed of a patch group of patches 42*c*1-1, 42*c*1-3, 42*c*1-5, 42*c*1-7, 42*c*1-9, 42*c*1-11, and 42*c*1-13 for the printing chip c1, and a reference pattern 41*c*1 formed at a position adjacent thereto.

As for the patches in the adjustment pattern 42*c*1, a result of printing performed while increasing an input voltage with a predetermined interval as viewed from left to right in FIG. 4 is illustrated. The predetermined interval may be an interval determined in advance. When the predetermined interval is varied, a density difference between adjacent patches included in the adjustment pattern 42*c*1 is to be varied. It is sufficient that an input voltage when forming the reference pattern 41*c*1 is determined in advance. Then, it is recommended that the input voltage for forming the reference pattern 41*c*1 is matched with an input voltage for forming one patch in the adjustment pattern 42*c*1 in advance, for example. For example, it is recommended that an input voltage when forming the central patch 42*c*1-7 in the adjustment pattern 42*c*1 is matched with the input voltage for forming the reference pattern 41*c*1. Further, a target density as the reference pattern 41*c*1 is matched with a target density of each patch of the adjustment pattern 42*c*1 in advance. Note that it is sufficient that a size and a printing position of the reference pattern 41*c*1 or each patch of the adjustment pattern 42*c*1 are determined in advance.

In addition, in the example of FIG. 4, a blank region 44 is provided between the adjustment pattern 42*c*1 and the reference pattern 41*c*1 to facilitate distinction between both the patterns, but the blank region 44 need not be provided. When there is no blank region 44, differences in density between the adjustment pattern 42*c*1 and the reference pattern 41*c*1 can be easily compared, and both the patterns can be compared with high accuracy. In addition, a blank region 43 is also provided between patches, such as between the patch 42*c*1-1 and the patch 42*c*1-3, to facilitate distinction between both the patches, but the blank region 43 need not be provided. However, when an input voltage is changed, a speed of an ink droplet is changed, and landing is shifted in the scanning direction of the carriage 12, and thus it is beneficial to provide the blank region 43 in order to prevent landing from being shifted for adjacent patches not to overlap each other.

Further, the test pattern also includes reference patterns and adjustment patterns for the other printing chips c2 to c5 to be adjusted. For example, the test pattern includes a reference pattern 41*c*2 and an adjustment pattern 42*c*2 for the printing chip c2, and a reference pattern 41*c*3 and an adjustment pattern 42*c*3 for the printing chip c3. Further, the test pattern includes a reference pattern 41*c*4 and an adjustment pattern 42*c*4 for the printing chip c4, and the reference pattern 41*c*2 and the adjustment pattern 42*c*2 for the printing chip c5. Of course, when printing cannot be performed within one sheet of the medium 30, printing may be performed over a plurality of sheets.

Additionally, although not illustrated in FIG. 4, it is recommended that a character indicating the test pattern of each of the printing chips c1 to c5 is printed. It is printed in advance on the medium 30A that the reference pattern 41*c*1 and the adjustment pattern 42*c*1 are the test patterns for the printing chip c1, at least that the adjustment pattern 42*c*1 is the adjustment pattern for the printing chip c1. As a result, when the user is caused to select a patch that matches a reference pattern, it is possible to prevent the user from confusing with selection places for other printing chips. Note that the reference pattern 41*c*2 can also be referred to as the reference pattern for the adjustment pattern 42*c*1. Of course, as illustrated in FIG. 4, a reference pattern 41*c*6 may also be formed below an adjustment pattern 42*c*5 in advance. As a result, every adjustment pattern has reference patterns arranged on upper and lower sides thereof, thereby facilitating comparison with the reference patterns.

Then, in step S1, formation of a reference pattern is performed under the following control. That is, the control unit 10 performs the print control such that at least two printing chips among the printing chips c1 to c5 included in the printing head 11C eject ink to an identical target region of the medium 30 to form a reference pattern in the identical target region. Note that the identical target region can also be referred to as an inside of an identical band. It is recommended that at least two printing chips among the printing chips c1 to c5 are determined in advance as the printing chips c1 and c2, for example. In this case, all of the reference patterns 41*c*1, 41*c*2, 41*c*3, 41*c*4, and 41*c*5 are formed by the printing chips c1 and c2. Hereinafter, the present embodiment will be described using an example in which printing chips used for forming a reference pattern are the two printing chips c1 and c2, but the present disclosure is not limited thereto, and the control unit 10 may perform the print control such that a reference pattern is formed by ejecting ink from all of the printing chips c1 to c5 included in the printing head 11C, for example.

Note that "the print control is performed such that at least two printing chips eject ink onto an identical target region of the medium 30 to form a reference pattern in the identical target region" includes formation of a reference pattern using at least one nozzle of each of printing chips used when forming the reference pattern, and a reference pattern need not necessarily be formed using all nozzles of printing chips used when forming the reference pattern.

Describing an identical target region 53 in FIG. 5, the control unit 10 may perform control such that pixels in the identical target region 53 are equally divided for the printing chips c1 and c2 used when forming a reference pattern, and the reference pattern is printed. To be more specific, the control unit 10 allocates an equal number of pixels in the identical target region 53 to each of the printing chips c1 and c2 used when forming a reference pattern. Then, it is recommended that the control unit 10 performs the print control such that both the printing chips c1 and c2 eject ink at the same target density to the pixels that are equally allocated to the printing chips c1 and c2, to form the reference pattern.

Ejecting ink at the same target density means ejecting ink at the same input voltage and ejection duty. Ejecting ink to equally allocated pixels means that ink having the same target density between the printing chips c1 and c2 is equally allocated and ejected so that target regions on the medium 30 to which the ink is ejected do not overlap each other. Note that since a reference pattern is a single density gradation pattern, the reference pattern is printed so that a portion where the ink is not ejected is not visible even when the ink is equally allocated and ejected.

For example, when a target density in a reference pattern is 80% of a maximum density, the control unit 10 performs control of ink ejection in the printing chips c1 and c2 such that each of the printing chips c1 and c2 is in charge of a density of 40%. In other words, in this case, the control unit 10 performs control such that ejection duties of the printing chips c1 and c2 become 40% and 40%, respectively. Note that in addition to such ejection control, it is recommended that the control unit 10 also performs control of relative movement between the printing chips c1 and c2 to form a reference pattern in a plurality of passes.

In order to form a reference pattern in the identical target region 53 by equally dividing a target density between the printing chips c1 and c2, the control unit 10 performs control as illustrated in FIG. 5, for example. That is, the control unit 10 causes the printing chip c1 to perform image formation in one portion 51 indicated by a pixel I in the identical target region 53, and causes the printing chip c2 to perform image formation in another portion 52 indicated by a pixel II in the identical target region 53. That is, the control unit 10 performs the print control such that printing is performed by the printing chips c1 and c2 alternately for each pixel or each rectangular pixel region in the identical target region 53.

As a result, the printing chip c1 is in charge of printing half of pixels in the identical target region 53, and the printing chip c2 is in charge of printing the remaining half of the pixels, so that the reference pattern can be printed with an average density of the printing chip c1 and the printing chip c2. In particular, instead of dividing an image forming region completely into a left half and a right half, for example, for the printing chips c1 and c2, by alternately printing a portion where an image is formed by the printing chips c1 and c2 as illustrated in FIG. 5, a reference pattern which can be uniformly visually recognized can be printed. Further, by such control, it is possible to print a reference pattern with an appropriate density for correction without requiring special processing such as acquiring an output density of each of the printing chips c1 and c2 as a numerical value for calculation.

However, even when the control unit 10 performs control of causing the printing chips c1 and c2 used when forming a reference pattern to eject ink at target densities different from each other, it is sufficient that a target density as the reference pattern matches a target density of each patch of an adjustment pattern.

In addition, although the example in which a reference pattern is formed in the identical target region 53 by the printing chips c1 and c2 has been described, the same applies to a case in which a reference pattern is formed in the identical target region 53 by three or more printing chips. For example, when a target density in a reference pattern is set to 80% of the maximum density and the printing chips c1 to c4 are used to form the reference pattern, it is recommended that the control unit 10 performs control of ink ejection in the printing chips c1 to c4 such that each of the printing chips c1 to c4 is in charge of a density of 20%.

In particular, when the control unit 10 performs the print control such that all of the printing chips c1 to c5 included in the printing head 11C eject ink to form a reference pattern, it is possible to print the reference pattern in which ejection characteristics of all of the printing chips c1 to c5 are averaged. Therefore, by forming the reference pattern in this manner, it is possible to perform correction with more appropriate values in consideration of the ejection characteristics of all the printing chips c1 to c5. However, by forming a reference pattern using a plurality of printing chips without using all of printing chips, it is possible to form the reference pattern in consideration of at least ejection characteristics of the plurality of printing chips, and thus it is possible to perform correction with appropriate values as compared to a case where one printing chip is used. This is because the ejection characteristics of the plurality of printing chips are close to ejection characteristics of all the printing chips to some extent, and even when one printing chip has an extreme value, correction can be performed with values that can reduce influence of the extreme value.

The description returns to the flowchart in FIG. 3. Following the printing of the test pattern in step S1, the control unit 10 performs the following processing. That is, for each of the printing chips c1 to c5, the control unit 10 determines whether an operation for selecting a patch matching the reference pattern is received from the operation reception unit 16 or an external device such as a PC via the communication unit 17 or not (step S2). For this reason, the operation reception unit 16 is configured in advance to be capable of receiving a user operation of selecting a patch of a gradation matching the reference pattern printed on the medium 30 from a patch group of each gradation in the adjustment pattern printed on the medium 30. Alternatively, the external device such as a PC is configured in advance to be capable of receiving such a user operation and transmitting contents of the user operation to the printing apparatus 1 via the communication unit 17. Of course, a configuration may be adopted in which such user operations can be received from both the operation reception unit 16 and the external device.

The user is to visually recognize the medium 30A, and select, for example, the patch 42*c*1-9, patches 42*c*2-11,

42*c*3-7, 42*c*4-5, and 42*c*5-5 as patches close to reference patterns for the printing chips c1, c2, c3, c4, and c5, respectively.

In a case of NO in step S2, the control unit 10 waits for reception of the above-described selection operation. In a case of YES in step S2, the control unit 10 adjusts an input voltage with a correction value corresponding to the patch designated by the above-described selection operation for each of the printing chips c1 to c5 (step S3), and ends the processing. In this adjustment, an initial value of the input voltage stored in the memory inside the control unit 10 or the storage unit 14 is rewritten to the correction value associated with the above-described selection operation, or the internal memory or the storage unit 14 is caused to store the correction value associated with the above-described selection operation so as to be associated with the initial value. In order to rewrite the initial value to the correction value or to store the correction value associated with the initial value, it is sufficient that a table or the like in which a patch included in an adjustment pattern is associated with a correction value is stored in the memory of the control unit 10 or the storage unit 14 for each of the printing chips c1 to c5.

That is, the control unit 10 acquires a correction value for each of the printing chips c1 to c5 by reading the correction value corresponding to a patch selected by a user operation from a correspondence relationship stored in advance. Then, the control unit 10 adjusts individual differences in ejection characteristics among the printing chips c1 to c5 by performing setting such that the acquired correction values are to be used at the time of printing. In the above-described example of selection, the input voltages are to be adjusted to correspond to the patches 42*c*1-9, 42*c*2-11, 42*c*3-7, 42*c*4-5, and 42*c*5-5, for the printing chips c1, c2, c3, c4, and c5, respectively.

Here, the adjustment with the correction values will be additionally described. As described above, receiving an operation of selecting a patch that matches a reference pattern for a certain printing chip from a patch group means receiving an instruction of designating a correction value for adjusting an ejection characteristic of the printing chip with an interval (hereinafter, referred to as an adjustment interval) corresponding to the above predetermined interval. That is, the printing apparatus 1 can include a correction reception unit that receives an instruction to designate the above correction value with the above adjustment interval. An example of the correction reception unit is the operation reception unit 16 or the communication unit 17.

As described above, in the present embodiment, by printing a test pattern in which a reference pattern and an adjustment pattern are arranged so as to be adjacent to each other, a difference between the reference pattern and the adjustment pattern can be easily compared by visual observation. Therefore, in the present embodiment, it is possible to recognize with high accuracy according to which patch of an adjustment pattern correction of input voltages among printing chips is to be performed by visual observation, and it is possible to perform correction with a reduced individual difference for a viewer. As described above, according to the printing apparatus 1, differences in output density at the time of printing among printing chips are to be evaluated by visual observation, but an adjustment pattern is printed at a position adjacent to a reference pattern. Therefore, according to the printing apparatus 1, evaluation hardly depends on an evaluator, and as a result, it is possible to accurately adjust differences in output density at the time of printing due to individual differences among printing chips.

In addition, in the printing apparatus 1 according to the present embodiment, since it is not necessary to prepare a sensor such as an imaging unit in order to reduce differences in output density at the time of printing due to individual differences among printing chips, it is possible to suppress an increase in manufacturing cost and an increase in size.

As described above, according to the printing apparatus 1, it is possible to accurately adjust differences in output density among printing chips while suppressing an increase in manufacturing cost and an increase in size. Actually, differences in output density among printing chips, that is, differences in printing density among the printing chips greatly affect image quality, however, the differences can be reduced in the printing apparatus 1, thus it is possible to improve the image quality.

Furthermore, there is a possibility that a reference pattern is printed at an extremely high or low density when depending on one printing chip, but in the present embodiment, a reference pattern is formed by a plurality of printing chips. Therefore, in the present embodiment, it is possible to prevent adjustment from being performed in accordance with an ejection characteristic of one certain printing chip, and to form a reference pattern at a density appropriate for correction. In the present embodiment, it is possible to avoid at least a situation in which correction is performed in accordance with a reference pattern having an extreme density without designation by a user.

In addition, according to the present embodiment, there is also an advantage in that a test pattern is printed on a sheet which is usually used by a user who purchased the printing apparatus 1, and ejection characteristics can be adjusted in accordance with a sheet which the user desires to use. Therefore, a sheet recommended by a manufacturer, such as a sheet used by a manufacturer of the printing apparatus 1 for adjusting ejection characteristics need not necessarily be prepared.

Embodiment 2

A printing apparatus according to Embodiment 2 is different from the printing apparatus according to Embodiment 1 only in print control for test pattern printing. Therefore, Embodiment 2 will also be described based on the configuration of the printing apparatus 1 in FIGS. 1 and 2, and will be described focusing on differences from Embodiment 1, but the various examples described in Embodiment can be applied. Also in the present embodiment, for simplification of description, only test pattern printing and adjustment for the printing chips c1 to c5 mounted at the printing head 11C will be described.

In Embodiment 1, the example in which a plurality of printing chips used for forming a reference pattern is determined in advance has been described. This test pattern printing is referred to as test pattern printing in a default mode. On the other hand, in the present embodiment, a plurality of printing chips used for forming a reference pattern can be changed.

Therefore, the printing apparatus 1 according to the present embodiment includes a reception unit that receives information indicating a priority at the time of adjustment of ejection characteristics. Hereinafter, this information is referred to as priority information. The priority information can be, for example, information indicating whether adjustment is performed with priority given to color development or whether adjustment is performed with priority given to a reduction in ink consumption. Further, the above reception unit can be exemplified by the operation reception unit 16 or the communication unit 17. The operation reception unit 16 transfers priority information received as a user operation to the control unit 10. The communication unit 17 receives priority information from an external device such as a PC, and transfers the priority information to the control unit 10.

The control unit 10 determines printing chips to be used when forming a reference pattern in accordance with the priority information received by the operation reception unit 16 or via the communication unit 17. For example, the control unit 10 changes printing chips used for forming the reference pattern from the printing chips c1 and c2 to the printing chips c2 and c3 or to the printing chips c4 and c5 in accordance with priority information. It is sufficient that a rule is determined in advance as to which printing chip is used to form a reference pattern in accordance with priority information.

With such a configuration, in the printing apparatus 1, by arranging a reference pattern and an adjustment pattern so as to be adjacent to each other, correction of input voltages among printing chips can be performed with high accuracy by visual observation, and it is possible to change gradations of the reference pattern based on a priority desired by the user, and perform printing. Therefore, it can be said that the printing apparatus 1 according to the present embodiment can perform a designation mode in which a priority is designated.

However, such an example in which a printing chip to be used when forming a reference pattern is determined in accordance with priority information can be applied to examples other than those in which a reference pattern is formed by at least two printing chips ejecting ink to the identical target region 53. That is, even in an example in which only one printing chip is used to form a reference pattern, determination of a printing chip according to priority information can be applied. However, also in this case, the control unit 10 performs the print control in advance such that a reference pattern and an adjustment pattern are formed at positions adjacent to each other when printing a test pattern is performed so that both the patterns can be easily compared with each other.

Figure 6:
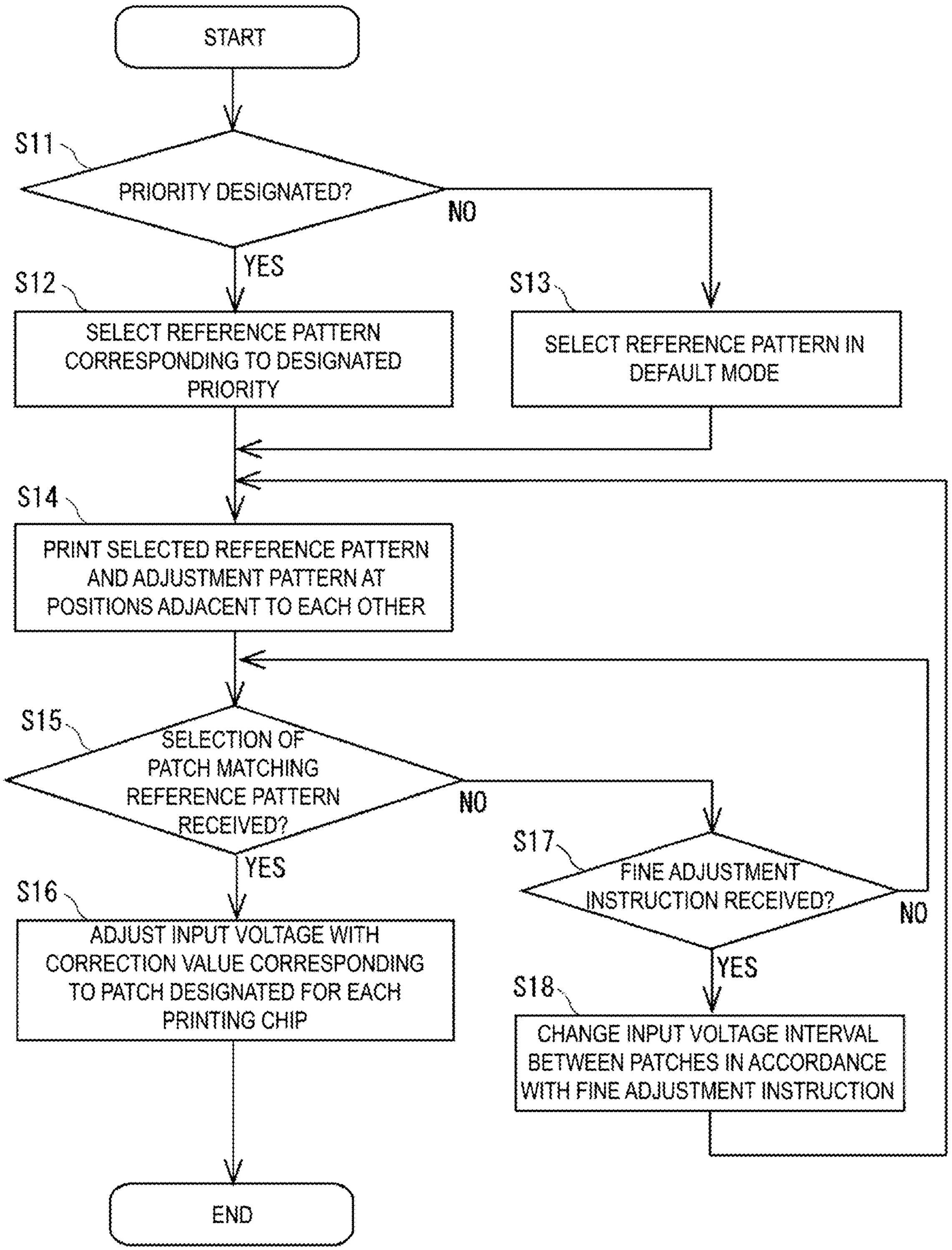
FIG. 6 is a flowchart illustrating one example of inter-chip output density adjustment processing in a printing apparatus according to Embodiment 2.
Figure 7:
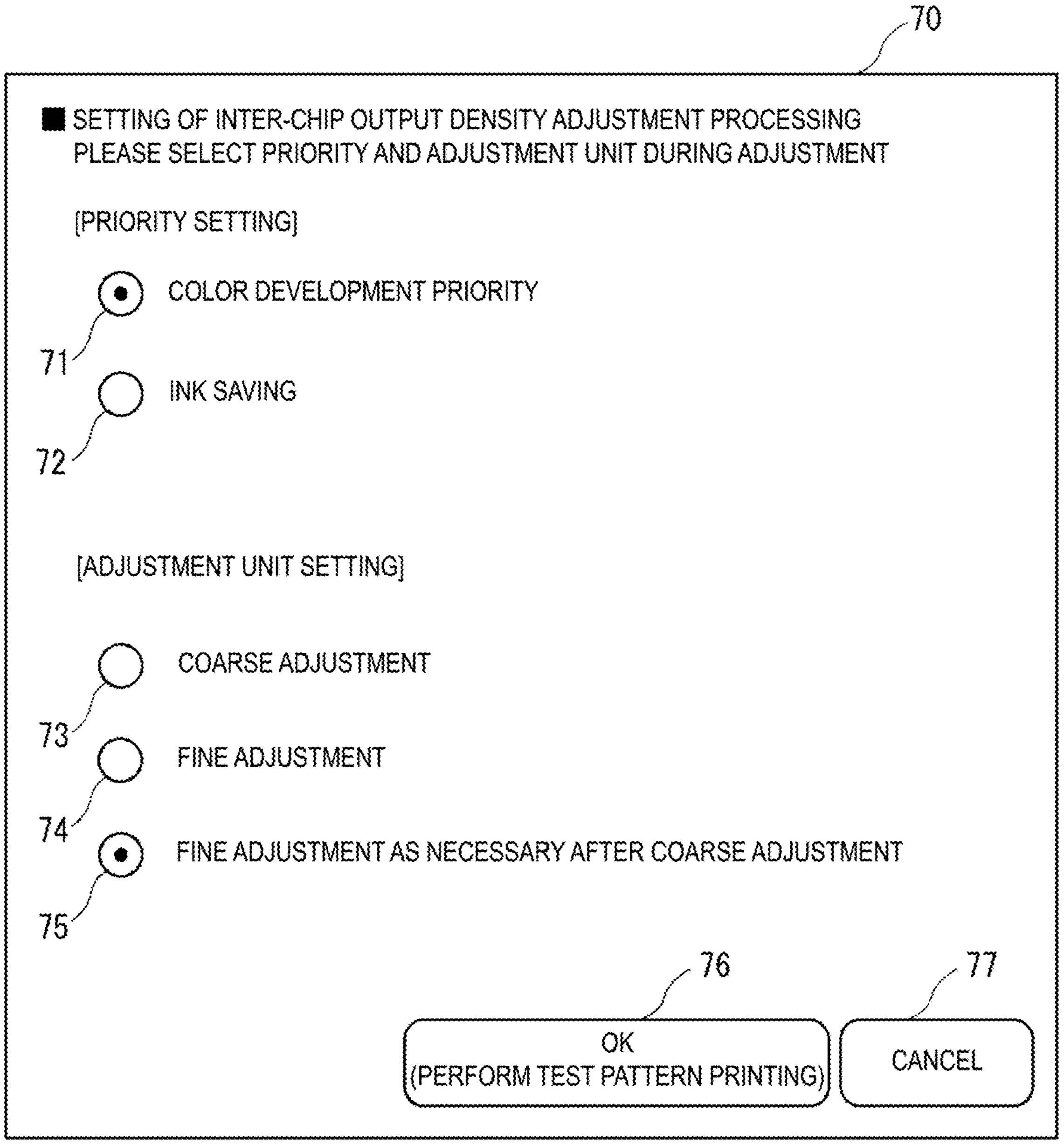
FIG. 7 is a diagram illustrating one example of a user interface used when the inter-chip output density adjustment processing in FIG. 6 is set.
Figure 8:
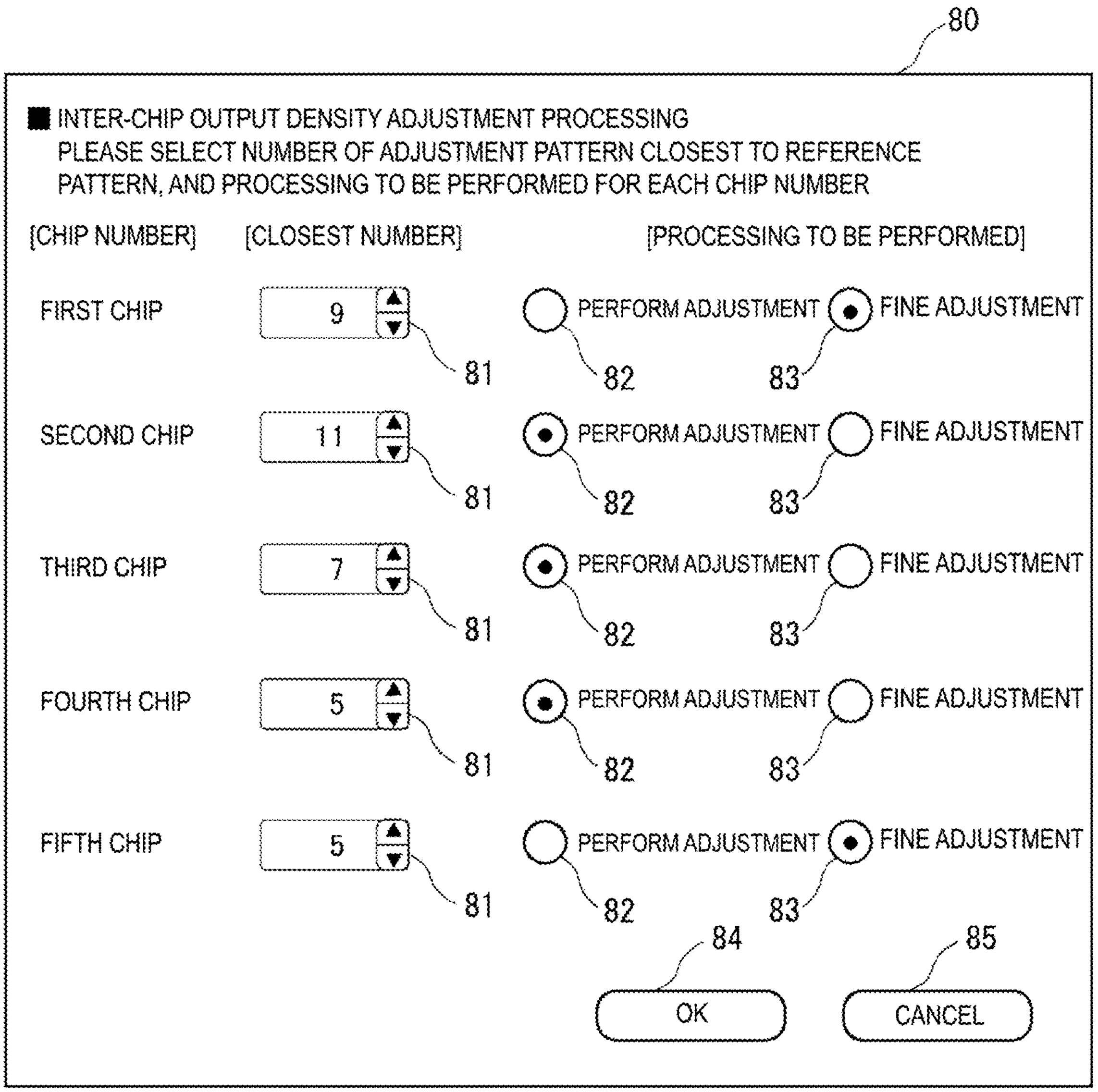
FIG. 8 is a diagram illustrating one example of the user interface used when the inter-chip output density adjustment processing in FIG. 6 is performed and reset.
Figure 9:
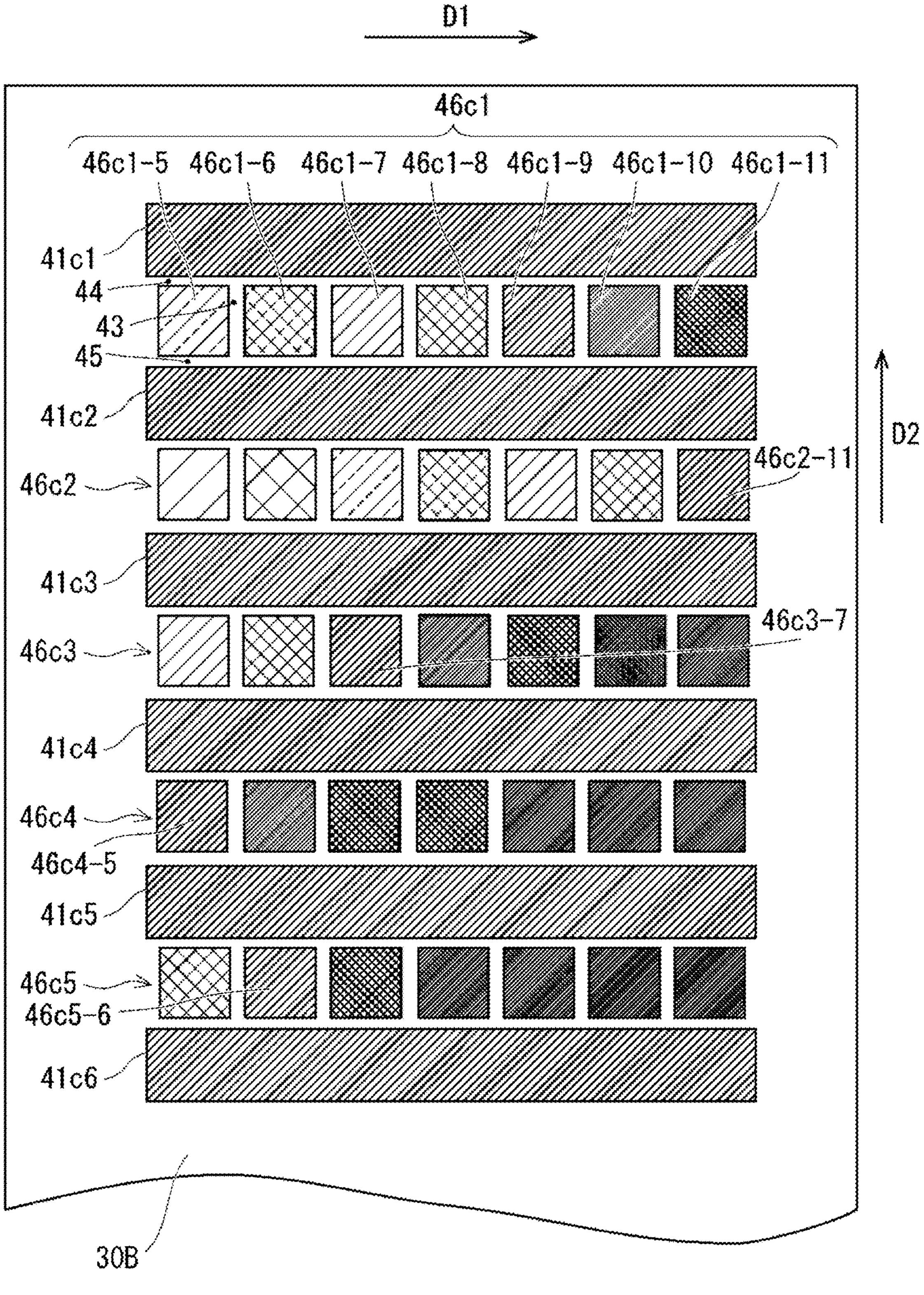
FIG. 9 is a schematic diagram illustrating another example of a test pattern printed on a medium in the inter-chip output density adjustment processing in FIG. 6.
Figure 10:
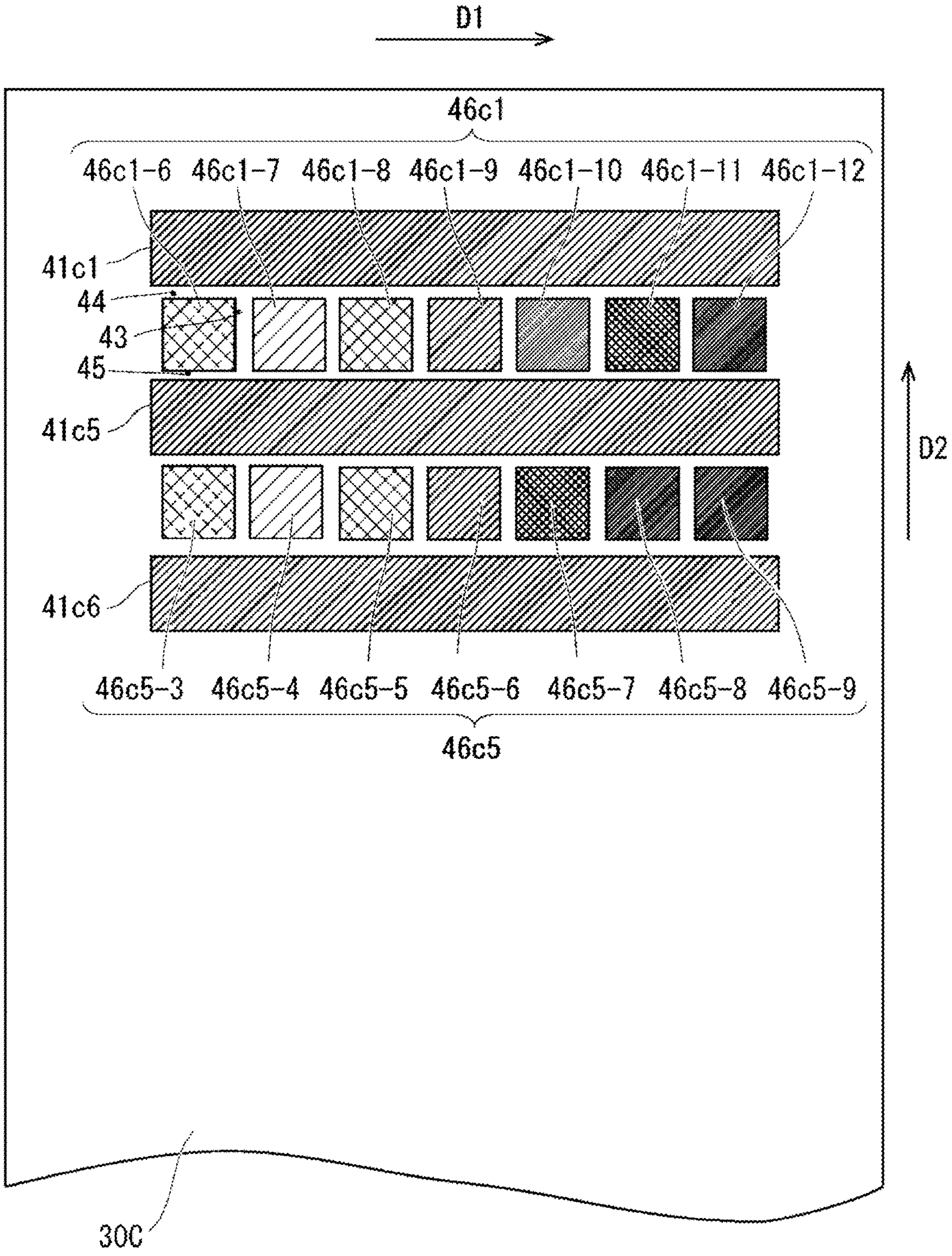
FIG. 10 is a schematic diagram illustrating one example of a test pattern printed based on an instruction from the user interface in FIG. 8, in the inter-chip output density adjustment processing in FIG. 6.
Figure 11:
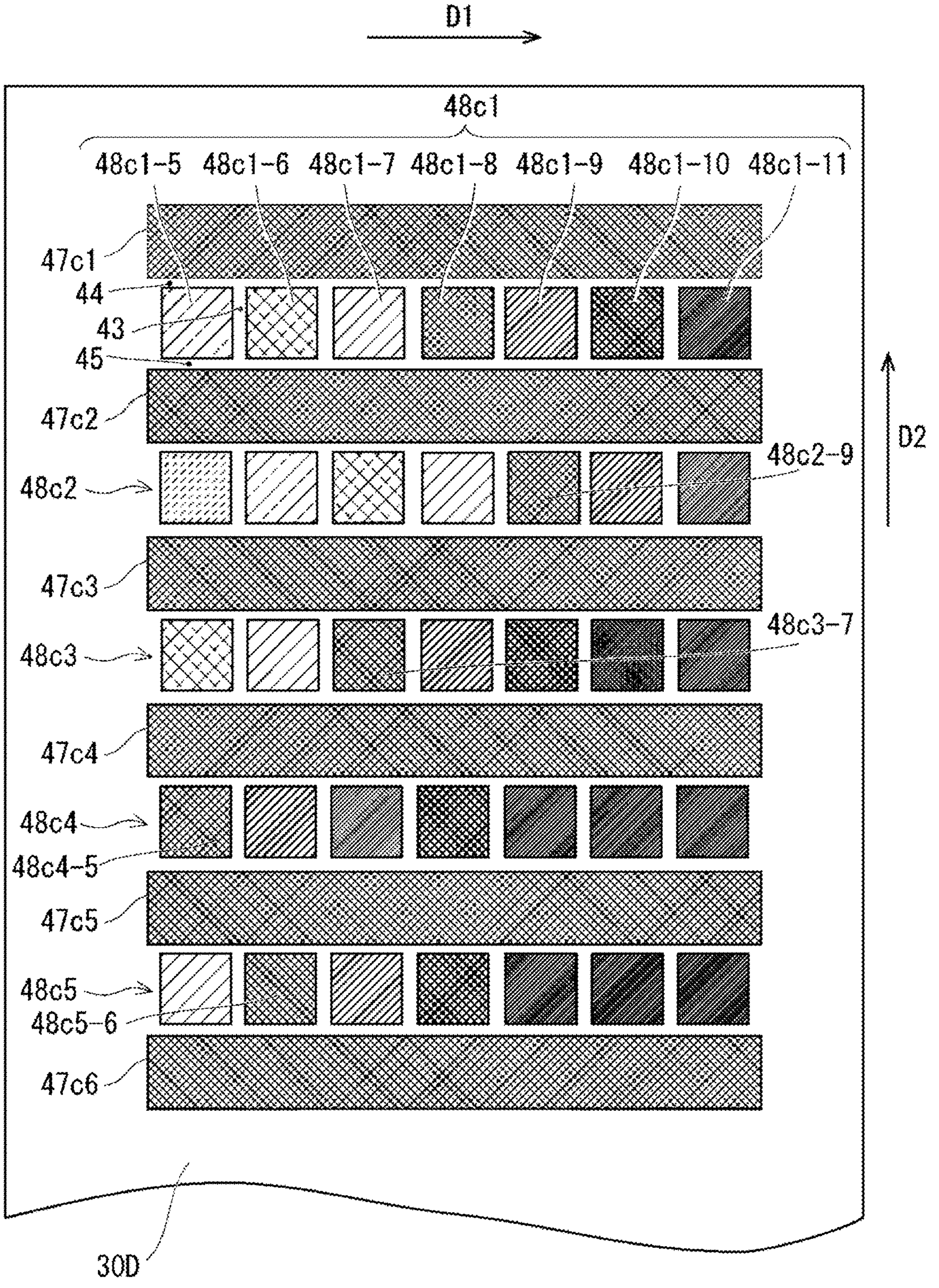
FIG. 11 is a schematic diagram illustrating one example of a test pattern printed based on another instruction from the user interface in FIG. 7, in the inter-chip output density adjustment processing in FIG. 6.

Next, one example of the inter-chip output density adjustment processing including test pattern printing processing in the printing apparatus 1 according to the present embodiment will be described using FIGS. 6 to 11 and 4. FIG. 6 is a flowchart illustrating one example of the inter-chip output density adjustment processing in the printing apparatus 1 according to the present embodiment. FIG. 7 is a diagram illustrating one example of a user interface used when the inter-chip output density adjustment processing in FIG. 6 is set. FIG. 8 is a diagram illustrating one example of the user interface used when the inter-chip output density adjustment processing in FIG. 6 is performed and reset. FIG. 9 is a schematic diagram illustrating another example of a test pattern printed on the medium 30 in the inter-chip output density adjustment processing in FIG. 6. FIG. 10 is a schematic diagram illustrating one example of a test pattern printed based on an instruction from the user interface in FIG. 8, in the inter-chip output density adjustment processing in FIG. 6. FIG. 11 is a schematic diagram illustrating one example of a test pattern printed based on another instruction from the user interface in FIG. 7, in the inter-chip output density adjustment processing in FIG. 6.

The inter-chip output density adjustment processing can be performed, for example, as in the flow illustrated in FIG. 6. To be specific, first, the control unit 10 determines whether priority information is received by the operation reception unit 16 or via the communication unit 17 or not, that is, whether a priority is designated or not (step S11).

In order to receive the priority information, for example, an image 70 of the user interface illustrated in FIG. 7 is caused to be displayed on the display unit 15 or an external device such as a PC. Note that when the external device is caused to display, it is sufficient that driver software for the printing apparatus 1 capable of displaying the image 70 and transmitting information designated thereon to the printing apparatus 1 side is stored in the external device in an executable state.

The image 70 can include, for example, radio buttons 71 and 72 for designating a priority, radio buttons 73 to 75 for setting an adjustment unit, an OK button 76, and a cancel button 77. The radio button 71 is a button for designating that adjustment is performed with priority given to color development. The radio button 72 is a button for designating that adjustment is performed with priority given to a reduction in amount of ink used.

In addition, the above-described adjustment unit indicates a difference in input voltage between adjacent patches included in an adjustment pattern, that is, a predetermined interval for input voltages between the adjacent patches. The radio button 73 is a button for selecting to perform coarse adjustment, and is a button for setting a first interval as the above predetermined interval. The radio button 74 is a button for selecting to perform fine adjustment, and is a button for setting a second interval smaller than the first interval as the above predetermined interval. The radio button 75 is a button for selecting to perform fine adjustment as necessary after printing of a test pattern for the coarse adjustment is performed. When the OK button 76 is selected in a state in which the radio button 75 is selected, it is recommended that the test pattern for the coarse adjustment in which the first interval is set as the above predetermined interval is printed, and thereafter, the processing transitions to an image 80 illustrated in FIG. 8 in which whether to perform fine adjustment or not can be selected. Of course, the present disclosure is not limited to the example in which the adjustment unit can be selected in the two stages of the coarse adjustment and the fine adjustment, and a configuration may be adopted in advance in which the adjustment unit can be selected in three or more stages of intervals. The processing according to the adjustment unit will be described later.

The OK button 76 is a button for performing printing of a test pattern. The cancel button 77 is a button for canceling and ending the processing. Note that instead of the radio buttons, a pull-down menu or the like may be used to cause the user to make a selection.

When any of the radio buttons 71 and 72 is selected, step S11 results in YES. In the case of YES in step S11, the control unit 10 selects a reference pattern corresponding to the designated priority by changing printing chips used when forming the reference pattern in accordance with the designated priority (step S12). When the radio button 71 is selected, a reference pattern for color development priority is selected, and when the radio button 72 is selected, a reference pattern for reducing an amount of ink used is selected. Adjustment performed by the user with reference to the selected reference pattern means that ejection characteristics are adjusted such that printing is performed in accordance with the designated priority. On the other hand, when NO in step S11, the control unit 10 selects a reference pattern of the default mode (step S13).

Next, the control unit 10 causes a test pattern to be printed on the medium 30 by performing control to form the reference pattern and the adjustment pattern selected in step S12 or step S13 at positions adjacent to each other (step S14). Although not illustrated in FIG. 6, the adjustment pattern printed in step S14 is determined according to the adjustment method selected in the item of adjustment unit setting in the image 70 in FIG. 7.

In step S14, for example, when the reference pattern for the color development priority is selected and the radio button 73 or 75 is selected, the test pattern as illustrated in FIG. 4 is printed on the medium 30. That is, in this case, the test pattern including the reference patterns 41*c*1 to 41*c*6 and the adjustment patterns 42*c*1 to 42*c*5 is printed on the medium 30. As a result, the medium 30A is obtained.

Here, formation of the reference pattern for the color development priority will be described. When received priority information indicates that priority is given to color development, the control unit 10 performs the print control such that a reference pattern is formed by ejecting ink from a printing chip that performs printing at a highest density among the printing chips c1 to c5 included in the printing head 11C. In this manner, by adjusting the reference pattern to the high density, the printing apparatus 1 can perform adjustment of an ejection characteristic such that printing in which a color gamut is secured, that is, printing at the high density can be performed. Note that by printing the reference pattern with one specific printing chip as in this example, the number of control steps can be reduced.

Although the example in which a printing chip for forming a reference pattern is selected from among the printing chips c1 to c5 included in the printing head 11C has been described, a printing chip for performing printing at a highest density may be selected from among printing chips determined in advance as candidates to be used when forming a reference pattern, for example, from the printing chips c1 and c2. As the printing chip that performs printing at the highest density, in an example in which the number of printing chips that print a reference pattern is limited to two or more, it is recommended to select a predetermined number of printing chips in order from a higher-density side, such as two highest printing chips among higher-density printing chips.

In addition, for example, as for the printing chip that performs printing at the highest density, for example, it is sufficient that a solid pattern is printed by each of the printing chips c1 to c5 in advance, and the user is caused to designate which printing chip has the highest density. Similarly, when a predetermined number of printing chips are selected from the high-density side, it is sufficient that the user is caused to designate in advance.

The description returns to FIG. 6. In step S14, for example, when the reference pattern for the color development priority is selected and the fine adjustment is selected, as illustrated in FIG. 9, a test pattern including the reference patterns 41*c*1 to 41*c*6 and adjustment patterns 46*c*1 to 46*c*5 is printed on the medium 30. As a result, a medium 30B is obtained. Here, the test pattern illustrated in FIG. 9 includes, for the printing chip c1, the adjustment pattern 46*c*1 formed of a patch group of patches 46*c*1-5 to 46*c*1-11 and the reference pattern 41*c*1 formed at a position adjacent thereto. Needless to say, the test pattern illustrated in FIG. 9 includes similar reference patterns and adjustment patterns also for the other printing chips c2 to c5. When the adjustment patterns 46*c*1 to 46*c*5 are compared with the adjustment patterns 42*c*1 to 42*c*5, an input voltage interval between patches is about 50%. For example, when the input voltage interval between patches for the adjustment patterns 42*c*1 to 42*c*5 is 1.0 V, the input voltage interval between the patches for the adjustment patterns 46*c*1 to 46*c*5 is 0.5 V. However, the values and the ratios of the interval between the patches in the patch group for the coarse adjustment and the interval between the patches in the patch group for the fine adjustment are not limited to those described above. For example, it may also be possible that the input voltage interval between the patches in the patch group for the coarse adjustment is 0.5 V, and the input voltage interval between the patches in the patch group for the fine adjustment is 0.1 V, or the like.

Here, the coarse adjustment and the fine adjustment will be described. The printing apparatus 1 according to the present embodiment is configured to be able to perform both the coarse adjustment and fine adjustment. As to which of the coarse adjustment and the fine adjustment is performed, for example, the user can select a desired one of the radio buttons 73 and 74 in the image 70 of FIG. 7 in advance. Here, an example is illustrated in which by selecting the radio button 75, as a further option, in the image 70 of FIG. 7, printing of the test pattern for the coarse adjustment is performed, and then the test pattern for the fine adjustment can be printed and the fine adjustment can be performed as necessary. Further, it may also be possible that the test pattern for the coarse adjustment and the test pattern for the fine adjustment are printed at the same time, and the user performs a check with a desired pattern for performing the adjustment.

That is, the control unit 10 may perform the print control such that a first patch group and a second patch group, which will be described next, are formed as adjustment patterns at the same time or at different times. Each of the first patch group and the second patch group is formed for each printing chip to be adjusted. The first patch group is a patch group in which a drive voltage for driving a printing chip is changed at a first interval. Note that the drive voltage refers to an input voltage applied to the printing chip. The second patch group is a patch group in which a drive voltage for driving a printing chip is changed at a second interval smaller than the first interval. As described above, the first interval and the second interval are the examples of the predetermined interval described above. Here, the values and ratios of the first interval for the coarse adjustment and the second interval for the fine adjustment are not limited to fixed values and may be changeable. This change can be performed by being designated by the user from the operation reception unit 16 or an external device.

When the first patch group and the second patch group are formed at the same time, for example, the medium 30A in FIG. 4 and the medium 30B in FIG. 9 are to be obtained by one print instruction, or the patch groups are to be printed on one sheet of medium by one print instruction. When the first patch group and the second patch group are formed in different regions of the same medium, by sandwiching a reference pattern between the first patch group and the second patch group, or the like, each of the patch groups may be formed at a position adjacent to the reference pattern. Alternatively, it may also be possible that the first patch group and the second patch group are arranged in one row and a reference pattern is formed in parallel to the row.

On the other hand, when the first patch group and the second patch group are formed at different times, for example, the medium 30A illustrated in FIG. 4 and the medium 30B illustrated in FIG. 9 are obtained at different times. This example will be described later.

The description returns to FIG. 6. In step S14, for example, when the reference pattern that gives priority to the decrease in the amount of ink used, that is, a reduction in the amount of ink used, is selected and when the fine adjustment is selected, the following printing is performed. That is, as illustrated in FIG. 11, a test pattern including reference patterns 47$c$1 to 47$c$6 and adjustment patterns 48$c$1 to 48$c$5 is printed on the medium 30, and a medium 30D is obtained. Here, the test pattern illustrated in FIG. 11 includes, for the printing chip c1, the adjustment pattern 48$c$1 formed of a patch group of patches 48$c$1-5 to 48$c$1-11 and the reference pattern 47$c$1 formed at a position adjacent thereto. Needless to say, the test pattern illustrated in FIG. 11 includes similar reference patterns and adjustment patterns for the other printing chips c2 to c5. The reference patterns 47$c$1 to 47$c$6 are formed to be reduced in target density as compared with the reference patterns 41$c$1 to 41$c$6. The adjustment patterns 48$c$1 to 48$c$5 are adjustment patterns that are reduced in target density in accordance with the reference patterns reduced in target density, as compared to the adjustment patterns 46$c$1 to 46$c$5, respectively. Of course, when the reduction in target density of the reference patterns is small, the adjustment patterns need not be reduced in target density.

Note that an example in which the reference pattern that gives priority to the reduction in the amount of ink used is selected and the coarse adjustment is selected is omitted, but a test pattern in which a density difference between adjacent patches is larger as compared with the medium 30D as in the example in FIG. 4 is to be printed.

Here, formation of the reference pattern for reducing the amount of ink used will be described. When received priority information indicates that priority is given to the reduction in the amount of ink used, the control unit 10 performs the following print control. That is, in this case, the control unit 10 performs the print control such that a reference pattern is formed by ejecting ink from a printing chip that performs printing at a lowest density among the printing chips included in the printing head 11C. As described above, by adjusting the reference pattern to the printing chip lowest in density, that is, the printing chip that performs the thinnest printing, the printing apparatus 1 can save an amount of ink consumed at the time of printing a test pattern, and adjust ejection characteristics specialized for printing in which the amount of ink consumed is saved.

Although the example in which a printing chip for forming a reference pattern is selected from among the printing chips c1 to c5 included in the printing head 11C has been described, a printing chip for performing printing at a lowest density may be selected from among printing chips determined in advance as candidates to be used when forming a reference pattern, for example, from the printing chips c1 and c2. As the printing chip that performs printing at the lowest density, in an example in which the number of printing chips that print a reference pattern is limited to two or more, it is recommended to select a predetermined number of printing chips in order from a lower-density side, such as two lowest printing chips among lower-density printing chips.

In addition, for example, as for the printing chip that performs printing at the lowest density, for example, it is sufficient that a solid pattern is printed by each of the printing chips c1 to c5 in advance, and the user is caused to designate which printing chip has the lowest density. Similarly, when a predetermined number of printing chips are selected from the low-density side, it is sufficient that the user is caused to designate in advance.

In addition, as priority information, for example, information indicating that priority is given to a balance between good color development and a reduction in an amount of ink used may be applied. In this case, when received priority information indicates that priority is given to the balance, the print control is performed such that a reference pattern is formed by ejecting ink from a printing chip that performs plausible printing that is neither too thin nor too thick, among the printing chips included in the printing head 11C.

The example in which a printing chip for forming a reference pattern is selected from among the printing chips c1 to c5 included in the printing head 11C has been described. However, a printing chip that performs plausible printing may be selected from among printing chips determined in advance as candidates to be used when forming a reference pattern, for example, from the printing chips c1 and c2. For example, as a printing chip that performs plausible printing, it is recommended that a solid pattern is printed by each of the printing chips c1 to c5 in advance, and the user selects or the control unit 10 automatically and randomly selects a printing chip from among printing chips other than printing chips that print to form thickest and thinnest solid patterns. Alternatively, a solid pattern may be printed by each of the printing chips c1 to c5 in advance, and a printing chip that performs plausible printing may be selected by another method, such as a method in which the user selects a chip that is visually determined to be close to an average from among the solid patterns.

The description returns to FIG. 6. Here, first, a case in which the OK button 76 is selected in the state in which the radio button 75 is selected will be described. In this case, after the test pattern for the coarse adjustment is printed as in the medium 30A in FIG. 4 in step S14, the image 80 in FIG. 8 is caused to be displayed on the display unit 15 or the external device such as a PC, and selection of a patch matching the reference pattern is received (step S15). Note that when the external device is caused to display, it is sufficient that driver software for the printing apparatus 1 capable of displaying the image 80 and transmitting information designated or selected thereon to the printing apparatus 1 side is stored in the external device in an executable state.

The image 80 includes, for example, a chip number of each of the printing chips c1 to c5, and includes a selection field 81 for selecting a number of a patch closest to the reference pattern and radio buttons 82 and 83 for selecting processing to perform in correspondence with each chip number. Further, the image 80 also includes an OK button 84 and a cancel button 85. The chip number and the patch number are also printed on the test pattern in advance. The selection field 81 may simply be an input field for inputting the number of the patch closest to the reference pattern. The radio button 82 is a button for performing adjustment. The radio button 83 is a button for performing the fine adjustment. The user is to select one of the radio buttons 82 and 83 for each chip number. Note that in the image 80, it also may be tolerated that the user does not select any of the radio buttons 82 and 83. It is sufficient to perform neither the coarse adjustment nor the fine adjustment for a printing chip corresponding to a chip number for which none of the radio buttons 82 and 83 is selected. In addition, instead of the radio buttons 82 and 83, the user may be caused to select processing to perform by a pull-down menu or the like. The OK button 84 is a button for performing the processing selected from the radio buttons 82 and 83. The cancel button 77 is a button for canceling and ending the processing.

On the other hand, when the OK button 76 is selected in a state in which any one of the radio buttons 73 and 74 is selected, although not illustrated, it is sufficient that an image that does not include the radio button 83 in the image 80 in FIG. 8 is displayed. When the radio button 74 is selected, the test pattern including a patch group for finely performed adjustment can be printed as compared with the case where the radio button 73 is selected, and thus adjustment can be performed more finely.

In a case of YES in step S15, the control unit 10 adjusts an input voltage with a correction value corresponding to the patch of the patch number designated in the selection field 81 for each printing chip (step S16), and ends the processing. In a case of NO in step S15, the control unit 10 determines whether a fine adjustment instruction by selection of the radio button 83 is received from the image 80 or not (step S17). Note that although details are not illustrated in FIG. 6, the reception of patch selection in step S15 and the determination of the reception of the fine adjustment instruction in step S17 are to be performed for each printing chip.

In a case of NO in step S17, the processing returns to the determination in step S15, and this is repeated until YES in step S15. In a case of YES in step S17, the control unit 10 changes a second interval of an input voltage between patches in accordance with the fine adjustment instruction, proceeds to step S14, and performs control to print the test pattern. As a result, as exemplified by the medium 30C in FIG. 10, the medium is to be obtained on which the test pattern is printed for the fine adjustment for the printing chips c1 and c5 for which the radio button 83 for the fine adjustment is selected. In addition, in the medium 30C, for the printing chip c1, patches 46*c*1-6 to 46*c*1-12 are formed with the number selected in the selection field 81 as a center, and for the printing chip c5, patches 46*c*5-3 to 46*c*5-9 are formed with the number selected in the selection field 81 as a center. Note that in the medium 30C, the reference patterns 41*c*1 and 41*c*5 are formed for comparison with the adjustment pattern 46*c*1, and the reference patterns 41*c*5 and 41*c*6 are formed for comparison with the adjustment pattern 46*c*5. If the fine adjustment is selected to be performed for all the printing chips c1 to c5 in the image 80, as exemplified by the medium 30B in FIG. 9, the medium on which the test pattern for the fine adjustment is printed is to be obtained.

As described above, in the example in FIG. 6, the fine adjustment is performed as necessary after the test pattern of the coarse adjustment is printed. As a result, even when there is no patch that matches the reference pattern when printing the test pattern for the coarse adjustment, it is possible to select a patch that matches the reference pattern by performing printing of the test pattern for the fine adjustment, which makes it possible to easily perform the adjustment of ejection characteristics even by visual observation. For example, in FIG. 4, it can be seen that there is no matching patch between the reference pattern 41*c*5 and the adjustment pattern 42*c*5, but the reference pattern 41*c*5 has a density between those of the patches 42*c*5-5 and 42*c*5-7. Therefore, by forming patches including at least one of the patch 42*c*5-5 and the patch 42*c*5-7 with an input voltage interval smaller than the input voltage interval between patches in the coarse adjustment, it is possible to form a patch that more closely matches the reference pattern. Of course, when a patch matching the reference pattern cannot be selected by printing the test pattern for the fine adjustment once, the printing of the test pattern for the fine adjustment in which the input voltage interval is reduced may be repeated until a patch matching the reference pattern can be selected. In this way, by performing printing of the test pattern for the fine adjustment as necessary after printing the test pattern for the coarse adjustment, it is possible to easily adjust the ejection characteristics even by visual observation.

Performing the printing of the test pattern for the fine adjustment after printing the test pattern for the coarse adjustment can be said to be an example of a case in which the first patch group and the second patch group are formed at different times. A case in which the first patch group and the second patch group are formed at different times will be additionally described. As illustrated in FIGS. 4 and 9, formation at different times may refer to image formation on different media. As described for the radio button 75 in FIG. 7, when the first patch group and the second patch group are formed on the different media, the adjustment pattern including the second patch group may be formed at a position adjacent to the reference pattern only when the user cannot identify a patch matching the reference pattern in the first patch group. Note that when the first patch group and the second patch group are formed on the different media, the patch groups may be considered to be formed as different test patterns.

The example of control in which printing of the test pattern for the fine adjustment is performed after printing of the test pattern for the coarse adjustment will be additionally described. The control unit 10 performs the print control so as to form, as an adjustment pattern, a first patch group in which a drive voltage for driving a printing chip is changed at a first interval. Then, the control unit 10 changes a drive voltage for driving a printing chip with a predetermined second interval smaller than the first interval when forming an adjustment pattern, and performs the print control so as to form a second patch group in which the drive voltage for driving the printing chip is changed at the second interval as the adjustment pattern. Alternatively, the printing apparatus 1 may include a reception unit that receives an instruction to change the drive voltage for driving the printing chip when forming the adjustment pattern with the second interval smaller than the first interval. This reception unit can also be exemplified by the operation reception unit 16 or the communication unit 17, similarly to the reception unit that receives priority information. Then, it is recommended that the control unit 10 performs the print control so as to form, as the adjustment pattern, a patch group in which the drive voltage for driving the printing chip is changed at the second interval. In any of the examples, after the test pattern including the patch group changed at the second interval is printed, the input voltage can be adjusted with the correction value corresponding to the patch of the patch number selected by the user operation from the patch group, in steps S15 and S16.

The example in which the fine adjustment is performed as necessary after printing of the test pattern for the coarse adjustment has been described above with reference to FIG. 6. However, the printing apparatus 1 may be configured to, even when the radio button 75 is selected, constantly receive selection of a patch matching a reference pattern from the user after printing of a test pattern for the coarse adjustment, and once perform adjustment of ejection characteristics by the coarse adjustment. In this case, it is sufficient that the control unit 10 adjusts an input voltage with a correction value corresponding to a patch of a patch number designated for each printing chip according to the selection, and performs printing of the test pattern for the fine adjustment after such coarse adjustment. In this case, the test pattern for the fine adjustment is to be printed based on the input voltage corrected by the coarse adjustment for each printing chip so as to include a patch group in which the input voltage is changed at the second interval. Then, after the printing, similarly to the coarse adjustment, when selection of a patch matching the reference pattern is received from the user, the control unit 10 adjusts the input voltage with a correction value corresponding to a patch of a patch number designated for each printing chip according to the selection, and thus the fine adjustment can be completed.

Further, the case in which the test pattern for the fine adjustment is printed after the test pattern for the coarse adjustment is printed has been described here, of course, it may also be possible that only the test pattern for the fine adjustment is printed. For example, when a voltage that matches a reference pattern to some extent is known, such as when adjustment is performed once previously so that an appropriate input voltage is known, it is sufficient that only printing of a test pattern for the fine adjustment is performed. In this case, printing of the test pattern for the fine adjustment may also be performed with an input voltage interval for the fine adjustment around that voltage.

In addition, in the above description, the example has been described in which the user selects, in the selection field 81, one patch from a patch group included in a printed test pattern, and an input voltage is adjusted with a correction value corresponding to the selected patch. However, as a modification, the printing apparatus 1 may be configured such that an input voltage can be adjusted also with an intermediate value between two correction values corresponding to adjacent patches in a patch group included in a printed test pattern, for example, in the selection field 81. As a result, an adjustment unit of an input voltage, that is, an adjustment unit of an ejection characteristic can be set to ½ times to perform more fine adjustment.

The above modification will be specifically described. The control unit 10 performs, in the same manner, the print control so as to form, as an adjustment pattern to be formed at a position adjacent to a reference pattern, a patch group in which a drive voltage for driving a printing chip is changed at a predetermined interval. However, in the above-described modification, in the printing apparatus 1, an adjustment interval received by the correction reception unit is set to an interval corresponding to an interval in a unit of one half of the above-described predetermined interval. That is, the printing apparatus 1 includes the correction reception unit that receives an instruction to designate a correction value for adjusting an ejection characteristic of a printing chip with an adjustment interval corresponding to an interval in a unit of one half of the above-described predetermined interval. This correction reception unit can also be exemplified by the operation reception unit 16 or the communication unit 17.

In the above-described modification, for example, even when a test pattern like the medium 30A in FIG. 4 is printed, it is possible to perform adjustment to a correction value corresponding to a middle between the patch 42*c*5-5 and the patch 42*c*5-7. For example, in FIG. 4, it can be seen that there is no matching patch between the reference pattern 41*c*5 and the adjustment pattern 42*c*5, but the reference pattern 41*c*5 has a density between those of the patches 42*c*5-5 and 42*c*5-7. In this case, the user can select “6” between “5” and “7” as a “closest number” in the selection field 81 for a fifth chip indicating the printing chip c5. As a result, the control unit 10 can adjust an input voltage of the printing chip c5 which is the fifth chip with a middle correction value between a correction value corresponding to the patch 42*c*5-5 and a correction value corresponding to the patch 42*c*5-7. Therefore, in the above-described modification, an adjustment unit of an input voltage, that is, an adjustment unit of an ejection characteristic is set to ½ times, and it is possible to perform more fine adjustment. In other words, the above-described modification has an effect that, it is possible to reduce the number of patches to be included in a test pattern and printed.

Next, a program for causing the printing apparatus 1 to perform printing from an external device such as a PC will be additionally described. This program is referred to as driver software or the like.

This program is a program for causing a computer such as a PC that controls the printing apparatus 1 to execute acquisition processing of causing the printing apparatus 1 to acquire a correction value for adjusting an ejection characteristic for each of the printing chips included in the printing head 11C. Then, the acquisition processing includes processing of performing test pattern printing for printing the test pattern as described above. In addition, the acquisition processing, as for a correction value for each of the printing chips included in the printing head 11C, receives a user operation of selecting a patch of a gradation that matches a reference pattern printed on the medium 30 from a patch group of each gradation in an adjustment pattern printed on the medium 30. Then, the acquisition processing causes the printing apparatus 1 to acquire a correction value corresponding to the patch selected by the user operation, by reading the correction value from a correspondence relationship stored in advance. As other application examples, the various application examples described in Embodiments 1 and 2 can be applied. For example, the program can also include a program that causes the above computer to execute processing of adjusting an ejection characteristic of each of the printing chips included in the printing head 11C based the correction values acquired in the acquisition processing.

As described above, according to the present embodiment, in addition to similar effects to those of Embodiment 1, printing chips used for forming a reference pattern can be changed. In particular, by determining printing chips to be used for forming a reference pattern in accordance with designation by the user, it is possible to form the reference pattern in accordance with a priority desired by the user, thus it is possible to obtain the printing apparatus 1 in which ejection characteristics are adjusted in accordance with the priority. Note that other effects obtained in the present embodiment are as described in the individual application examples.

Other Modifications

The present disclosure is not limited to the above-described embodiments, and modifications can be made to the above-described embodiments on an as-necessary basis without departing from the spirit and gist of the present disclosure. For example, the printing apparatus according to the present embodiment can be configured so as not to include some of the constituent elements of the printing apparatus 1 illustrated in FIG. 1. For example, even when the printing apparatus 1 includes only one of the display unit 15, the operation reception unit 16, and the communication unit 17, a user operation can be received.

In addition, the above description has been given assuming that the printing apparatus includes a printing head dedicated to each color such that one color of ink corresponds to one printing chip, but the present disclosure is not limited thereto. For example, the printing apparatus may include one or more printing heads in which two or more colors of ink correspond to one printing chip, and in this case, it is recommended that adjustment is performed for each printing chip and for each color, or is performed for each printing chip with a pattern of a composite color of colors of ink that can be ejected by the printing chips. In addition, the printing apparatus may include one or more printing heads in which ink of one or more colors is ejected from a plurality of printing chips. In this case, it is recommended that adjustment is performed for each printing chip and for each color, or is performed for each printing chip with a pattern of a composite color of colors of ink that can be ejected by the printing chips. Of course, adjustment for a plurality of printing chips included in a plurality of printing heads can be performed at the same time, and in this case, it is sufficient that a test pattern for each printing chip is printed simultaneously on the same medium or on successively transported media.

In addition, the above description has been given assuming that a nozzle ejects one type of dot, but the printing apparatus may be configured such that two or more types of dots having sizes different from each other are separately ejected by changing types of input signals, that is, by changing an input voltage. In this case, printing of a test pattern and adjustment of ejection characteristics can be performed only for dots of a predetermined type or of a type designated by the user, but may be performed for each type of dot.

In addition, the above description has been given assuming that the printing apparatus is an inkjet printer, but the printing apparatus can be widely applied to a copying machine, a facsimile machine, a multifunction peripheral having these functions, and the like.

Figure 12:
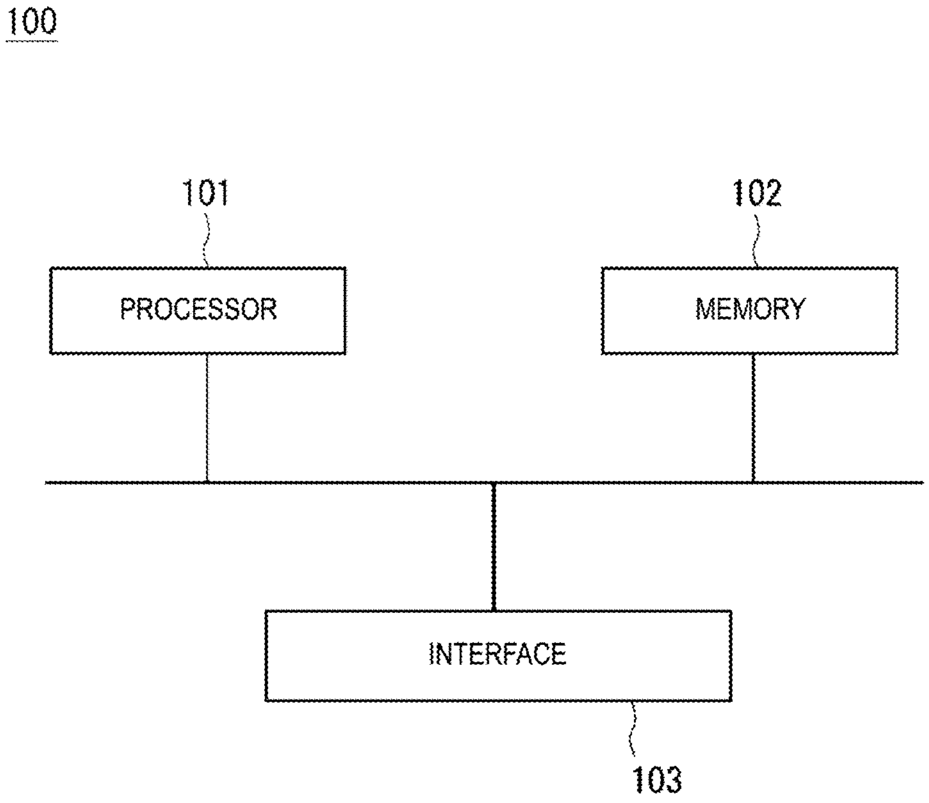
FIG. 12 is a diagram illustrating one example of a hardware configuration of a device.

Further, each of the above-described printing apparatus and the external device such as a PC can be provided with, for example, the following hardware configuration. FIG. 12 is a diagram illustrating one example of a hardware configuration of a device.

A device 100 illustrated in FIG. 12 may include a processor 101, a memory 102, and an interface 103. The interface 103 may include, for example, a communication interface and an interface with an input/output device, which are necessary depending on the device.

The processor 101 may be, for example, a CPU, a GPU, a micro processor unit (MPU) also referred to as a microprocessor, or the like. The processor 101 may include a plurality of processors. The memory 102 is configured by, for example, a combination of a volatile memory and a nonvolatile memory. Functions of each device are achieved by the processor 101 reading a program stored in the memory 102 and executing the program while exchanging necessary information via the interface 103.

Furthermore, the program described above includes a group of instructions (or software codes) that cause a computer to execute one or more functions described in the embodiment when read in the computer. The program may be stored in a non-transitory computer-readable medium or a tangible storage medium. By way of example and not limitation, the computer-readable medium or a tangible storage medium includes a random-access memory (RAM), a read-only memory (ROM), a flash memory, a solid-state drive (SSD), or other memory technologies. In addition, by way of example and not limitation, the computer-readable medium or tangible storage medium includes a CD-ROM, a digital versatile disc (DVD), a Blu-ray (trade name) disk, other optical disk storages, a magnetic cassette, a magnetic tape, a magnetic storage, or other magnetic storage device. The program may be transmitted through a transitory computer-readable medium or a communication medium. By way of example and not limitation, the transitory computer-readable medium or a communication medium includes an electrical-type, an optical-type, an acoustical-type, or other types of propagation signal.

These are descriptions of the present disclosure using the embodiment. However, the present disclosure is not limited to the configurations of the embodiments described above. It is needless to say that the present disclosure includes various types of modifications, corrections, and combinations that the skilled person in the art could make within the scope of the claimed disclosure in claims according to the present application.

What is claimed is:

1. A printing apparatus, comprising:

a printing head including a plurality of printing chips including a plurality of nozzles configured to eject liquid onto a medium;

a main scanning unit configured to relatively move the printing head and the medium in a main scanning direction;

a sub-scanning unit configured to relatively move the printing head and the medium in a sub-scanning direction intersecting the main scanning direction; and a control unit configured to perform print control including control of the relative movement by the main scanning unit and the sub-scanning unit and control of the ejection of the liquid from the printing head to perform printing on the medium, and configured to print a test pattern for acquiring a correction value for adjusting an ejection characteristic for each of the printing chips included in the printing head, wherein the test pattern includes a reference pattern being a single density gradation and an adjustment pattern including a patch group in which a single density gradation patch is formed for each of a plurality of different gradations, and the control unit performs the print control such that when printing of the test pattern is performed, the reference pattern and the adjustment pattern are formed at positions adjacent to each other, and such that the liquid is ejected onto an identical target region of the medium using at least two of the printing chips among the printing chips included in the printing head for the reference pattern to be formed in the identical target region.

2. The printing apparatus according to claim 1, wherein the control unit performs print control such that the reference pattern is formed by ejecting the liquid from each of the printing chips used when forming the reference pattern with an identical target density, and onto equally allocated positions.

3. The printing apparatus according to claim 1, wherein the control unit performs print control such that the reference pattern is formed by ejecting the liquid onto the identical target region using all of the printing chips of the printing chips included in the printing head.

4. The printing apparatus according to claim 1 comprising a reception unit configured to receive information indicating a priority when the ejection characteristic is adjusted, wherein the control unit determines the printing chip to be used when forming the reference pattern according to the information received by the reception unit.

5. A printing apparatus including a printing head including a plurality of printing chips including a plurality of nozzles configured to eject liquid onto a medium, a main scanning unit for relatively moving the printing head and the medium in a main scanning direction, a sub-scanning unit for relatively moving the printing head and the medium in a sub-scanning direction intersecting the main scanning direction, and a control unit for performing print control including control of the relative movement by the main scanning unit and the sub-scanning unit and control of the ejection of the liquid from the printing head to perform printing on the medium, and configured to print a test pattern for acquiring a correction value for adjusting an ejection characteristic for each of the printing chips included in the printing head, the printing apparatus further comprising a reception unit configured to receive information indicating a priority when the ejection characteristic is adjusted, wherein the test pattern includes a reference pattern being a single density gradation and an adjustment pattern including a patch group in which a single density gradation patch is formed for each of a plurality of different gradations, and the control unit when performing printing of the test pattern, performs the print control such that the reference pattern and the adjustment pattern are formed at positions adjacent to each other, and determines the printing chip used when forming the reference pattern, according to the information received by the reception unit.

6. The printing apparatus according to claim 4, wherein when the information is information indicating that priority is given to color development, the control unit performs print control such that the reference pattern is formed by ejecting the liquid from the printing chip that performs printing at a highest density among the printing chips included in the printing head or among the printing chips determined in advance as candidates to be used when the reference pattern is formed.

7. The printing apparatus according to claim 4, wherein when the information is information indicating that priority is given to a reduction in an amount of the liquid used, the control unit performs print control such that the reference pattern is formed by ejecting the liquid from the printing chip that performs printing at a lowest density among the printing chips included in the printing head or among the printing chips determined in advance as candidates to be used when the reference pattern is formed.

8. The printing apparatus according to claim 1, wherein the control unit performs print control such that a first patch group in which a drive voltage for driving the printing chip is changed at a first interval, and a second patch group in which the drive voltage is changed at a second interval smaller than the first interval are formed as the adjustment pattern, at the same time or at different times.

9. The printing apparatus according to claim 1, wherein the control unit performs print control such that as the adjustment pattern, a patch group in which a drive voltage for driving the printing chip is changed at a predetermined interval, and the printing apparatus includes a correction reception unit for receiving an instruction to designate the correction value for adjusting the ejection characteristic of the printing chip at an interval corresponding to an interval in a unit of one half of the predetermined interval.

10. An adjustment method in a printing apparatus that includes a printing head including a plurality of printing chips including a plurality of nozzles configured to eject liquid onto a medium, a main scanning unit for relatively moving the printing head and the medium in a main scanning direction, and a sub-scanning unit for relatively moving the printing head and the medium in a sub-scanning direction intersecting the main scanning direction, and performs print control including control of the relative movement by the main scanning unit and the sub-scanning unit and control of the ejection of the liquid from the printing head to perform printing on the medium, wherein the printing apparatus performs test pattern printing of printing a test pattern for acquiring a correction value for adjusting an ejection characteristic for each of the printing chips included in the printing head, the test pattern includes a reference pattern being a single density gradation and an adjustment pattern including a patch group in which a single density gradation patch is formed for each of a plurality of different gradations, and the test pattern printing is performed by performing the print control such that the reference pattern and the adjustment pattern are formed at positions adjacent to each other, and such that the liquid is ejected onto an identical target region of the medium using at least two of the printing chips among the printing chips included in the printing head for the reference pattern to be formed in the identical target region.

11. The adjustment method according to claim 10, wherein the printing apparatus acquires the correction value for each of the printing chips included in the printing head, by receiving a user operation of selecting a patch of a gradation matching the reference pattern printed on the medium from a patch group of each gradation in the adjustment pattern printed on the medium, and reading a correction value corresponding to the patch selected by the user operation from a correspondence relationship stored in advance.

* * * * *